United States Patent
Kawashima

[11] Patent Number: 6,105,054
[45] Date of Patent: Aug. 15, 2000

[54] MULTI-POINT-TO-POINT CONFERENCING SYSTEM WHERE TERMINALS EXCHANGE CONTROL CHANNEL MESSAGES INDICATING DATA CHANNEL AVAILABILITY AND THE RESERVE DATA CHANNELS ACCORDINGLY

[75] Inventor: Masanori Kawashima, Yokosuka, Japan

[73] Assignee: Canon Kabushiki Kaisha, Tokyo, Japan

[21] Appl. No.: 08/681,956

[22] Filed: Jul. 30, 1996

[30] Foreign Application Priority Data

Jul. 31, 1995 [JP] Japan .................................. 7-194973
Jul. 25, 1996 [JP] Japan .................................. 8-196255

[51] Int. Cl.$^7$ .......................... G06F 15/16; H04L 12/16; H04M 3/42
[52] U.S. Cl. .......................... 709/204; 370/261; 379/202
[58] Field of Search .................................. 709/204, 202; 370/260, 264, 524, 261, 262, 263, 401, 402, 407, 433, 437, 498; 379/202, 203, 204, 205, 206, 67; 348/13, 14, 15

[56] References Cited

U.S. PATENT DOCUMENTS

| | | | |
|---|---|---|---|
| 4,888,766 | 12/1989 | Ogasawara | 370/437 |
| 4,958,343 | 9/1990 | Abramovici et al. | 370/439 |
| 5,373,549 | 12/1994 | Bales et al. | 379/93.21 |
| 5,400,335 | 3/1995 | Yamada | 370/524 |
| 5,402,418 | 3/1995 | Shibata et al. | 370/264 |
| 5,412,418 | 5/1995 | Nishimura et al. | 348/14 |
| 5,422,883 | 6/1995 | Hauris et al. | 370/261 |
| 5,459,721 | 10/1995 | Yoshida | 370/392 |
| 5,604,738 | 2/1997 | Shibata et al. | 370/264 |
| 5,663,953 | 9/1997 | Maekawa | 370/261 |
| 5,675,583 | 10/1997 | Bales et al. | 370/261 |
| 5,680,399 | 10/1997 | Totzke et al. | . |
| 5,694,394 | 12/1997 | Shinohara | 370/401 |
| 5,748,625 | 5/1998 | Hashimoto | 370/401 |
| 5,757,781 | 5/1998 | Gilman et al. | 348/15 |
| 5,812,585 | 9/1998 | Hallock et al. | 370/522 |
| 5,852,466 | 12/1998 | Komine et al. | 348/15 |
| 5,959,978 | 10/1999 | Horikoshi et al. | 370/264 |

*Primary Examiner*—Zarni Maung
*Assistant Examiner*—Andrew Caldwell
*Attorney, Agent, or Firm*—Fitzpatrick, Cella, Harper & Scinto

[57] ABSTRACT

A multi-point-to-point conferencing system comprising a plurality of terminals connected by a network including data and control channels is disclosed. In a particular embodiment, the network is an Integrated Services Digital Network (ISDN) having data (B) channels and a control (D) channel. The conference is established in a manner that does not waste connection setup attempts or data channel connect time by attempting to establish a conference when a participating terminal does not have the necessary data channels available. The terminal initiating the conference communicates with at least one participating terminal to determine the use status, or availability, of the required number of data channels. If a participating terminal decides to join the conference, either automatically or through user confirmation, the participating terminal (1) reserves the required data channels for a limited time such that connection requests are only accepted from conference terminals and (2) communicates its decision to the initiating terminal. Now knowing that data channel connections can be successfully established between those terminals ready to participate, the initiating terminal initiates a conference using normal multi-point-to-point connection procedures.

32 Claims, 20 Drawing Sheets

FIG. 6

| 600 | | | | |
|---|---|---|---|---|
| DIAL NUMBER 601 | USER ABBREVIATION 602 | TRANSMISSION OF CONFIRMATION 603 | RECEPTION OF RESPONSE 604 | CONNECTION 605 |
| 0000000001 | ○○Co., Ltd. xx | TRANSMITTED | RECEIVED | READY |
| 0000000002 | ○○Co., Ltd. □□ | TRANSMITTED | RECEIVED | NOT READY |
| 0000000003 | ○○Co., Ltd. △△ | TRANSMITTED | | |
| 0000000004 | xx K.K. Mr. ○△ | TRANSMITTED | | |

FIG. 16

| NUMBER 1601 | ADDRESS 1602 | CONNECTION SIDE NUMBER 1603 | NUMBER OF CONNECTION 1604 | CONNECTION 1605 |
|---|---|---|---|---|
| 1 | 0123456789 | 2 | 1 | |
| 2 | 0123456788 | 3 | 0 | NOT READY TO CONNECT |
| 3 | 0123456787 | 4 | 1 | |
| 4 | 0123456786 | 1 | 0 | |
| | | | | |
| | | | | |

MULTI-POINT-TO-POINT CONFERENCING SYSTEM WHERE TERMINALS EXCHANGE CONTROL CHANNEL MESSAGES INDICATING DATA CHANNEL AVAILABILITY AND THE RESERVE DATA CHANNELS ACCORDINGLY

BACKGROUND OF THE INVENTION

1. Field of the Invention

The present invention relates to multi-point-to-point communication system and communication apparatus capable of multi-point-to-point communication by connecting a plurality of communication terminals, and more particularly to a multi-point-to-point communication system, communication apparatus, communication method and storage medium containing program for indicating the communication method capable of smooth multi-point-to-point connection.

2. Related Background Art

With recent advancement of image compression coding technique and population of a high speed and high quality digital line as represented by ISDN, a recommendation for AV (audio visual) services was defined by the ITU-T Recommendations H.320, H.242 and H.221 Recommendations and various television conference system which are in accord with those Recommendations have been developed. Such television conference systems include a multi-point-to-point television conference system which allows the television conferences among three or more multi-points. In the ISDN, any user information may be stored in user information which may be added to a specific control signal in a D-channel (control channel) or a sub-address which may be added to a call setup message for transmission.

The multi-point-to-point television conference system includes a multi-point-to-point connection configuration which uses an MCU (multi-point-to-point conference control unit) and a multi-point-to-point connection configuration which does not use the MCU but connects the television conference terminals in ring or chain.

In the multi-point-to-point configuration which does not use the MCU, a multi-point-to-point connection list storing information of the television conference terminals participating in the multi-point-to-point television conference is transferred between adjacent television conference terminals, and based on the information of the received multi-point-to-point connection list, a destination television conference terminal is determined and in this manner the ring or chain shaped multi-point-to-point connection is configured. In the multi-point-to-point connection which does not use the MCU, adjacent television conference terminals are directly connected to configure the ring or chain shaped communication path. Thus, at least two B-channels (information channels) must be empty in order to set two adjacent television conference terminals and the communication path in each of the television conference terminals participating in the multi-point-to-point television conference.

FIG. 2 shows a connection configuration for connecting four-point television conference terminals in ring as an example of the multi-point-to-point connection which does not use the MCU.

In FIG. 2, numeral 200 denotes an ISDN basic interface for forming two B-channels for transferring user data and one D-channel for transferring control data, numeral 201 denotes a television conference terminal (hereinafter referred to as a control television conference terminal) which performs a quasi-MCU function to control the present multi-point-to-point television conference, numerals 202–204 denote television conference terminals (hereinafter referred to as participating television conference terminals) which participate in the present multi-point-to-point television conference and numeral 205 denotes one B-channel path of the ISDN basic interface 200 connecting the television conference terminals 201–204.

In conducting the ring-shaped multi-point-to-point connection as shown in FIG. 2, it is common that the control television conference terminal (typically a television conference terminal that calls the multi-point-to-point television conference) for controlling the multi-point-to-point connection is provided as shown by 201 in FIG. 2 and the control television conference terminal determines the connection configuration for connecting the other participating television conference terminals (which television terminal calls and connects to which television conference terminal).

FIG. 3 shows a sequence of a multi-point-to-point connection procedure (protocol) for the four points shown in FIG. 2.

In S300, call and connection are made from the control television conference terminal 201 of the multi-point-to-point television conference to the participating television conference terminal 202.

In S301, as connection process between the control television conference terminal 201 and the participating television conference terminal 202, a D-channel connection procedure (protocol), a synchronization establishment procedure (protocol) and a capability exchange procedure (protocol) are executed to establish a data transfer path (hereinafter referred to as a data path) which utilizes LSD (low speed data) of the H.221 frame between the control television conference terminal 201 and the participating television conference terminal 202.

In S302, a connection request including information on an address number of the participating television conference terminal 203 is informed from the control television conference terminal 201 to the participating television conference terminal 202 in order to additionally connect the participating television conference terminal 203.

In S303, the participating television terminal 202 receives the connection request of S302 and conducts call and connection to the participating television conference terminal 203.

In S304, as connection process between the participating television conference terminal 202 and the participating television conference terminal 203, the D-channel connection protocol, the synchronization establishment protocol and the capability exchange protocol are executed to establish a data path between the participating television conference terminal 202 and the participating television conference terminal 203.

In S305, the completion of the connection process between the participating television conference terminal 202 and the participating television conference terminal 203 is informed by the data path from the participating television conference terminal 202 to the control television conference terminal 201.

In S306, a connection request including information on the address number of the participating television conference terminal 204, etc. is informed over the data path from the control television conference terminal 201 to the participating television conference terminal 203 through the participating television conference terminal 202 in order to additionally connect the participating television conference terminal 204.

In S307, the participating television conference terminal 203 receives the connection request of S306 and calls the participating television conference terminal 204.

In S308, as the connection process between the participating television conference terminal 203 and the participating television conference terminal 204, the D-channel connection protocol, the synchronization establishment protocol and the capability exchange protocol are executed and a data path between the participating television conference terminal 203 and the participating television conference terminal 204 is established.

In S309, the completion of the connection process between the participating television conference terminal 203 and the participating television conference terminal 204 is informed over the data path from the participating television conference terminal 203 to the participating television conference terminal 201 through the participating television conference terminal 202.

In S310, a connection request including information on the address number of the television conference terminal 201 is informed over the data path from the control television conference terminal 201 to the participating television conference terminal 204 through the participating television conference terminals 202 and 203 in order to connect the participating television conference terminal 204 and the control television conference terminal 201.

In S310, the participating television conference terminal 204 receives the connection request of S310 and calls and connects the participating television conference terminal 201.

In S312, as the connection process between the participating television conference terminal 204 and the control television conference terminal 201, the D-channel protocol, the synchronization establishment protocol, the capability exchange protocol, etc. are executed and a data path between the participating television conference terminal 204 and the participating television conference terminal 201 is established.

By the above procedure, the multi-point-to-point connection process of the participating television conference terminals 201–204 is completed and the multi-point-to-point communication is ready.

In the example of the multi-point-to-point connection shown in FIGS. 2 and 3, it is assumed that all of the participating television conference terminals of the multi-point-to-point television conference can be multi-point-to-point connected (at least two B-channel are available). In FIGS. 2 and 3, if one of the participating television conference terminals 201–204 is in communication with a television conference terminal which is not related to the multi-point-to-point television conference, the normal multi-point-to-point connection protocol shown in FIG. 3 cannot be executed.

FIG. 4 shows an example in which the participating television conference terminal 203 is in communication with other television conference terminal 400 in the multi-point-to-point connection shown in FIG. 2.

FIG. 5 shows a sequence of multi-point-to-point connection protocol when a participating television conference terminal which cannot be multi-point-to-point connected as shown in FIG. 4 is included in the multi-point-to-point connection protocol.

In S500, the control television conference terminal 201 of the multi-point-to-point television conference calls and connects the participating television conference terminal 202.

In S501, as the connection process between the control television conference terminal 201 and the participating television conference terminal 202, the D-channel connection protocol, the synchronization establishment protocol, the capability exchange protocol, etc. are executed and a data path between the control television conference terminal 201 and the participating television conference terminal 202 is established.

In S502, a connection request including information on the address number of the participating television conference terminal 203 is informed over the data path from the control television conference terminal 201 to the participating television conference terminal 202 in order to additionally connect the participating television conference terminal 203.

In S503, the participating television conference terminal 202 receives the connection request of S502 and calls and connects the participating television conference terminal 203.

In S504, as the connection process between the participating television conference terminal 202 and the participating television conference terminal 203, the D-channel connection protocol, the synchronization establishment protocol, the capability exchange protocol, etc. are executed and a data path between the participating television conference terminal 202 and the participating television conference terminal 203 is established.

In S505, the completion of the connection process between the participating television conference terminal 202 and the participating television conference terminal 203 is communicated over the data path from the participating television conference terminal 202 to the participating television conference terminal 201.

In S506, a connection request including information on the address number of the participating television conference terminal 204 is communicated over the data path from the participating television conference terminal 201 to the participating television conference terminal 203 through the participating television conference terminal 202 in order to additionally connect the participating television conference terminal 204.

In S507, when one B-channel is busy communicating with the television conference terminal 400, the incapability of communication between the participating television conference terminals 203 and 204 is communicated over the data path from the participating television conference terminal 203 to participating television conference terminal 201 through participating television conference terminal 202.

In S508, the disconnection of the participating television conference terminal 203 which was not multi-point-to-point connected is informed over the data path from the control television conference terminal 201 to the participating television conference terminal 202.

In S509, the participating television conference terminal 202 receives the disconnection request of S508 and executes a disconnection protocol including the capability exchange protocol, etc. to disconnect the participating television conference terminal 203.

In S510, the participating television conference terminal 202 disconnects the participating television conference terminal 203.

In S511, the completion of the disconnection of the participating television conference terminal 203 is communicated over the data path from the participating television conference terminal 202 to the control television conference terminal 201.

In S512, a connection request including information on the address number, etc. of the participating television conference terminal 204 is communicated over the data path from the control television conference terminal 201 to the participating television conference terminal 202 in order to additionally connect the participating television conference terminal 204.

In S513, the participating television conference terminal 202 receives the connection request of S512 and calls and connects the participating television conference terminal 204.

In S514, as the connection process between the participating television conference terminal 202 and the participating television conference terminal 204, the D-channel connection protocol, the synchronization establishment protocol, the capability exchange protocol, etc. are executed and a data path between the participating television conference terminal 202 and the participating television conference terminal 204 are established.

In S515, the completion of the connection process between the participating television conference terminal 202 and the participating television conference terminal 204 is communicated over the data path from the participating television conference terminal 202 to the control television conference terminal 201.

In S516, a connection request including information on the address number, etc. of the control television conference terminal 201 is communicated over the data path from the control television conference terminal 201 to the participating television conference terminal 204 through the participating television conference terminal 202.

In S517, the participating television conference terminal 204 receives the connection request of S516 and calls and connects the control television conference terminal 201.

In S518, as the connection process between the participating television conference terminal 204 and the control television conference terminal 201, the D-channel connection protocol, the synchronization establishment protocol, the capability exchange protocol, etc. are executed and a data path between the participating television conference terminal 204 and the control television conference terminal 201 is established.

By the above procedure, the multi-point-to-point connection process of the television conference terminals 201, 202 and 204 is completed and the multi-point-to-point communication is ready.

In the prior art multi-point-to-point television conference system, as shown in FIG. 4, if a participating television conference terminal of the multi-point-to-point television conference is in communication with a television conference terminal which is not related to the multi-point-to-point television conference, the normal multi-point-to-point connection protocol as shown in FIG. 3 cannot be executed and a complex error recovery process as shown in FIG. 5 is needed. As a result:

1) since the charge to the television conference terminal having the B-channel is terminated during the process of starting the multi-point-to-point connection, additional charge is accrued which is not related to the actual multi-point-to-point television conference due to the time required to complete the multi-point-to-point connection;

(2) extra charge also accrues because the B-channel is connected to a television conference terminal which is not multi-point-to-point connected; and (3) the user is required to wait during the time required to complete the multi-point-to-point connection.

SUMMARY OF THE INVENTION

It is an object of the present invention to provide communication system, communication apparatus, communication method and storage medium containing program for indicating the communication method which solve the above problems.

It is another object of the present invention to provide a communication system, communication apparatus, communication method and storage medium containing program for indicating the communication method which can shorten the time for the communication connection in the multi-point-to-point communication.

It is other object of the present invention to provide communication system, communication apparatus, communication method and storage medium containing program for indicating the communication method which can reduce a cost required for the multi-point-to-point communication.

It is a further object of the present invention to provide communication system, communication apparatus, communication method and storage medium containing program for indicating the communication method which have new functions.

One aspect of the present invention is directed to a communication system for facilitating communication among a plurality of communication terminals. At least one of the communication terminals includes means for inquiring to another communication terminal about the use status of a data channel owned by the other communication terminal using a control channel. The communication terminal also includes means for connecting a communication line among the plurality of communication terminals in accordance with a confirmation result. The control means connects the communication line when the confirmation result indicates that the data channel is connection ready so that the data channel charge is reduced. The other communication terminal includes means for informing the use status of the data channel in response to the inquiry from the confirmation means.

Other objects, aspects and features of the present invention will be apparent from the following description of the embodiments and the accompanying drawings.

BRIEF DESCRIPTION OF THE DRAWINGS

FIG. 6 shows a format of a multi-point-to-point connection list for controlling the multi-point-to-point conference in the television conference system in accordance with a first embodiment of the present invention.

FIG. 16 shows an example of a format of a multi-point-to-point connection list for controlling the multi-point-to-point connection in the television conference system in accordance with the second embodiment of the present invention.

DETAILED DESCRIPTION OF THE PREFERRED EMBODIMENTS

A television conference terminal in one embodiment of the present invention is now described with reference to the drawings for a multi-point-to-point television conference system which is an example of the communication system and communication apparatus of the present invention.

[First Embodiment]

Figure 1:
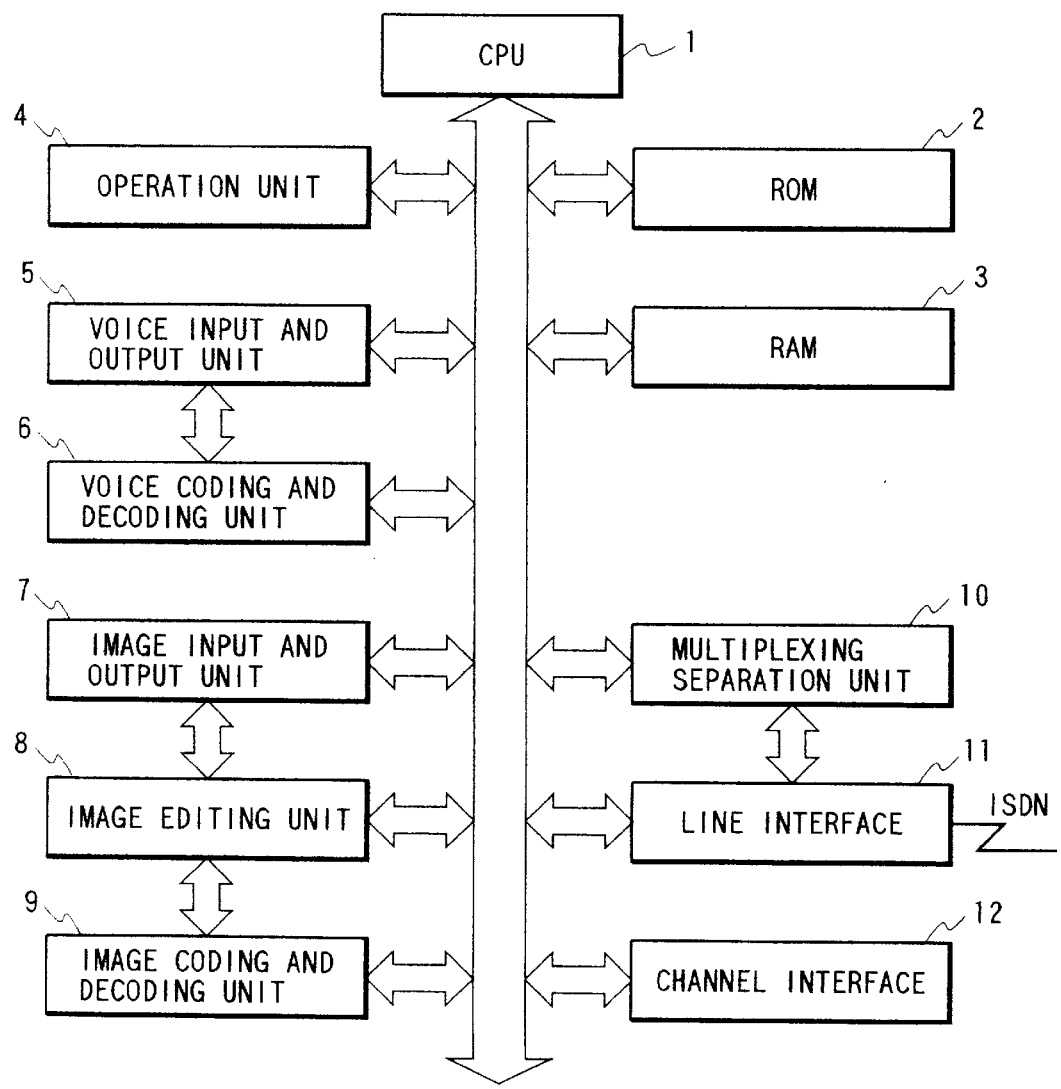
FIG. 1 shows a block diagram of a configuration of a television conference terminal in accordance with one embodiment of the present invention.
Figure 2:
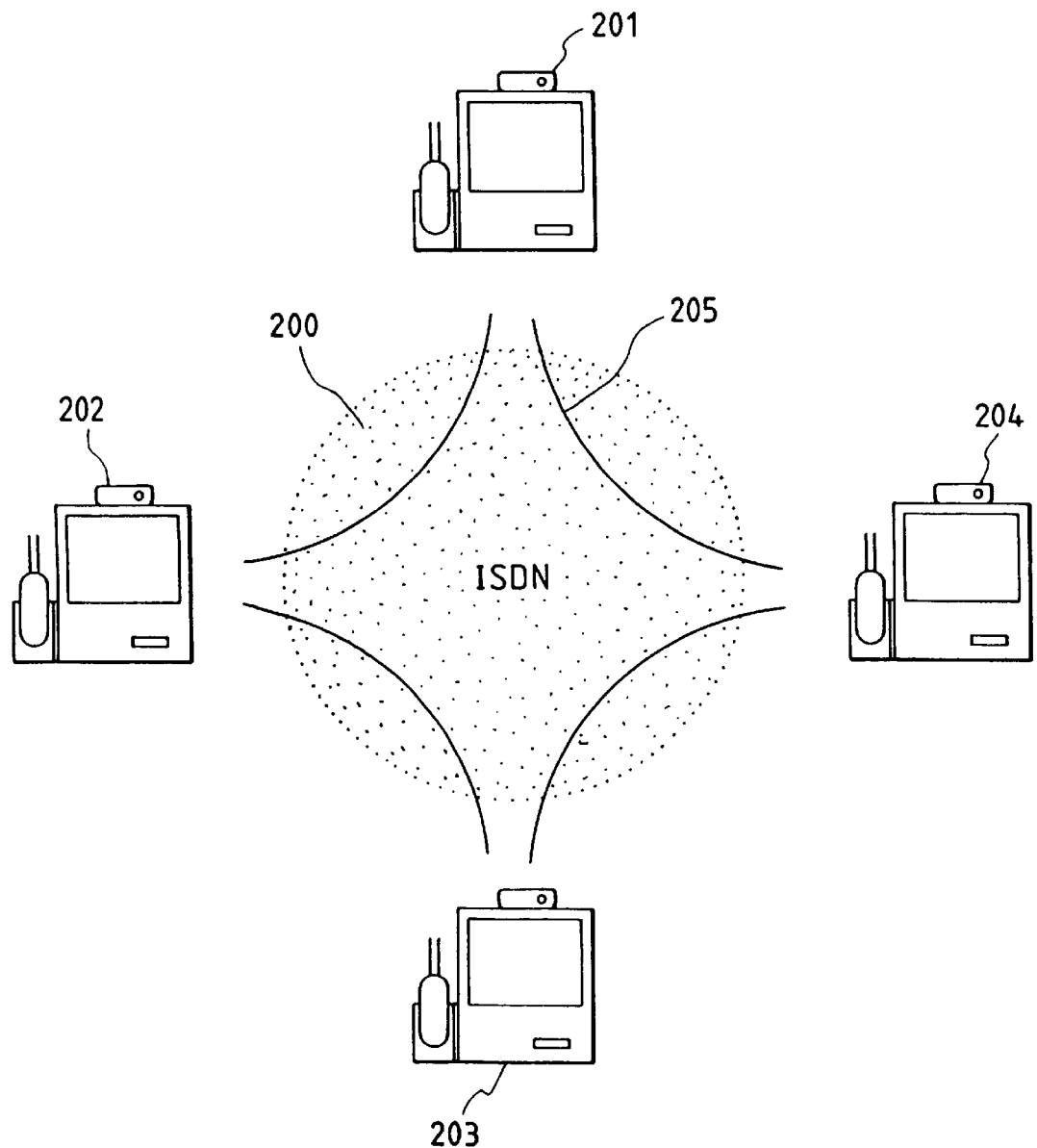
FIG. 2 shows an example of a typical connection configuration of the multi-point-to-point connection in which television conference terminals at four points are connected in ring.

FIG. 1 shows a block diagram of a configuration of a television conference terminal in accordance with the embodiment of the present invention.

In FIG. 1, numeral 1 denotes a CPU for executing program stored in a ROM 2, numeral 2 denotes the ROM storing the program of flow charts to be described later for controlling the television conference terminal, numeral 3 denotes a RAM used as storage area of various data such as a multi-point-to-point connection list 13 and a connection failure terminal list 14 and as a work area of the CPU 1, numeral 4 denotes a console unit having input devices such as a keyboard, a tablet and a mouse used to enter control information for controlling the present television conference system, numeral 5 denotes a voice input/output unit having a handset, a microphone and a speaker for conducting analog/digital conversion and digital/analog conversion processes of the input/output voice signals, numeral 6 denotes a voice codec unit for conducting coding of the transmission audio signal and decoding of the received voice signal in accordance with a voice coding and decoding algorithm defined by the ITU-T Recommendation G-series, numeral 7 denotes an image input/output unit having image input/output means such as a CRT monitor, a camera for a person object and a camera for a document object for conducting analog/digital conversion and digital/analog conversion processes of the input/output image signals, numeral 8 denotes an image edit unit for conducting processes such as windowing, filtering and combining of character data and/or graphic data, numeral 9 denotes an image codec unit for conducting coding of the transmission image and decoding of the received image in accordance with the image coding and decoding algorithm defined by the ITU-T Recommendation H.261, numeral 10 denotes a multiplexing/separation unit for conducting multiplexing to multiplex the voice signal form the voice codec unit 6, the image signal from the image codec unit 9 and various data signals inputted through a channel interface in accordance with the ITU-T Recommendation H.221 by transmission frame unit in accordance with the current communication capability and the communication mode and conducting separation process for separating the received frame to media of components and informing them to the voice codec unit 6, the image codec unit 9 and the channel interface 12, numeral 11 denotes a line interface connected to an ISDN line for controlling the line in accordance with the ISDN user network interface, and numeral 12 denotes a channel interface for connecting an external device such as a personal computer.

FIG. 6 shows a format of the multi-point-to-point connection list stored in the RAM 3 in the television conference terminal of the embodiment of the present invention for controlling the multi-point-to-point television conference.

In FIG. 6, numeral 600 denotes a multi-point-to-point connection list which stores information on participating television conference terminals of the multi-point-to-point television conference, numeral 601 denotes a dial number filed which is one of elements of the multi-point-to-point connection list 600 for storing a dial number to call the participating television conference terminal, numeral 602 denotes a user abbreviation field which is one element of the multi-point-to-point connection list 600 for storing a user abbreviation to identify the participating television conference terminal, numeral 603 denotes a confirmation transmission field which is one element of the multi-point-to-point connection list 600 for recording the confirmation for the connection to the participating television conference terminal, numeral 604 denotes a response reception field which is one element of the multi-point-to-point connection list 600 for recording the reception of connection response from the participating television conference terminal, and numeral 605 denotes a connection field which is one element of the multi-point-to-point connection list for recording whether the participating television conference terminal can be multi-point-to-point connected.

In the present embodiment, it is assumed that the multi-point-to-point connection list 600 shown in FIG. 6 is prepared by the user by the input from the console unit for each of the multi-point-to-point television conference which are scheduled to be held.

Figure 7:
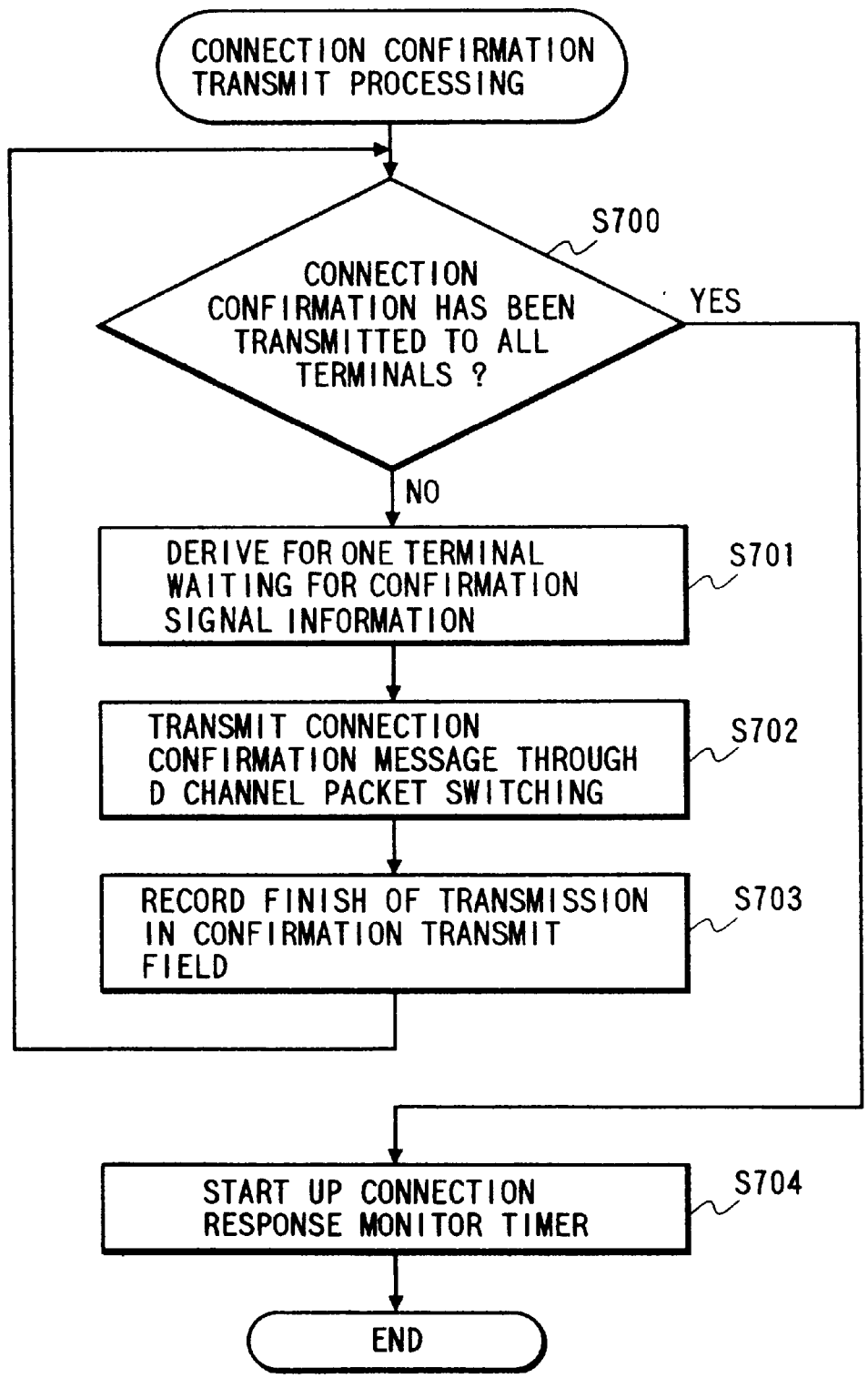
FIG. 7 shows a flow chart of an example of a connection confirmation transmission process in a television conference terminal in accordance with the first embodiment of the present invention.

FIG. 7 shows a flow chart of an example of the connection confirmation transmission process in the television conference terminal in accordance with the embodiment of the present invention.

In S700, the confirmation transmission field 603 of the multi-point-to-point connection list 600 is examined and if the connection confirmation message has been transmitted to all participating television conference terminals, the process proceeds to S704 (Yes in S700), and if it has not been transmitted, the process proceeds to S701 (No in S700).

In S701, information for one of the participating television conference terminals for which is waiting for the confirmation signal is being waited for is taken from the multi-point-to-point connection list 600.

In S702, D-channel packet switching path is set to the participating television conference terminal whose information was taken out in S701 and the connection confirmation message which contains the information on the dial number field 601 indicating the dial number and the information on the control television conference terminal of the multi-point-to-point connection list 600 is transmitted.

In S703, "transmitted" is set in the confirmation transmission field 603 for the participating television conference terminal which transmitted the connection confirmation message.

In S704, the connection response monitor timer for monitoring the reception of the connection response messages from all participating television conference terminals is started.

The connection response transmission process shown in FIG. 7 is started when the multi-point-to-point connection is requested by the user in the control television conference terminal.

Figure 8:
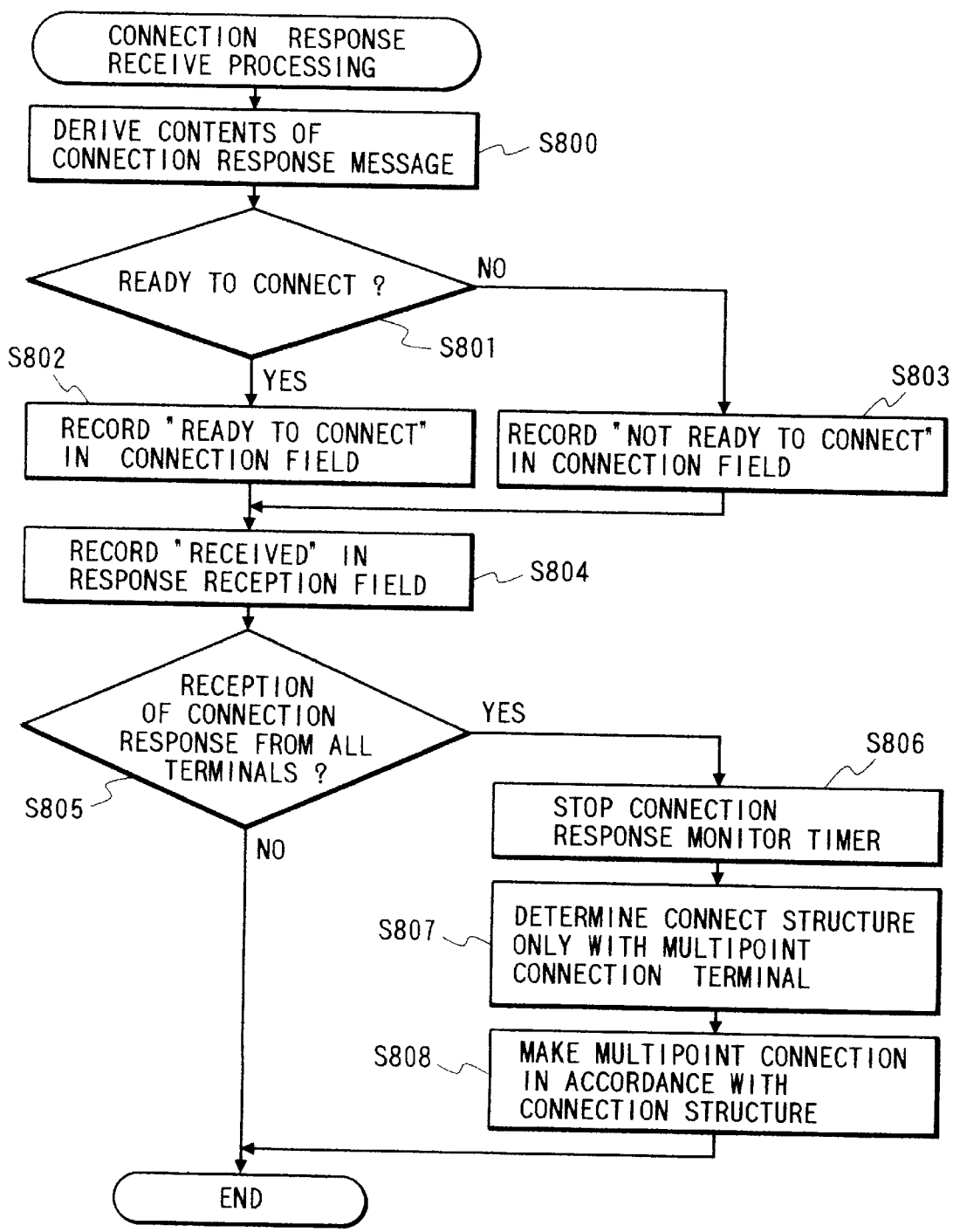
FIG. 8 shows a flow chart of an example of a connection response reception process in the television conference terminal in accordance with the first embodiment of the present invention.

FIG. 8 shows a flow chart of an example of the connection response reception process in the control television conference terminal in accordance with the embodiment of the present invention.

In S800, the information on the multi-point-to-point connection is taken from the connection response message received from the participating television conference terminal in accordance with the process of the flow chart of FIG. 7.

In S801, the information taken out in S800 is examined and if the information indicate "ready to connect", the process proceeds to S802 (Yes in S801), and if it is "not ready to connect", the process proceeds to S803 (No in S801).

In S802, "ready to connect" is set to the connection field 605 for the participating television conference terminal which transmitted the connection response message.

In S803, "not ready to connect" is set to the connection field 605 for the participating television conference terminal which transmitted the connection response message.

In S804, "received" is set to the connection reception field 604 for the participating television conference terminal which transmitted the connection response message.

In S805, the response reception field 604 is examined and if the connection response messages have been received from all participating television conference terminals, the process proceeds to S806 (Yes in S805) and they have not been received, the connection response reception process is terminated (No in S805) and the process stands by to wait for the next connection response message from the terminal.

In S806, the connection response monitor timer started in S704 of FIG. 7 is stopped.

In S807, the connection configuration for connecting only the television conference terminals which permit the multi-point-to-point connection is determined based on the information of the connection field 605.

Figure 3:
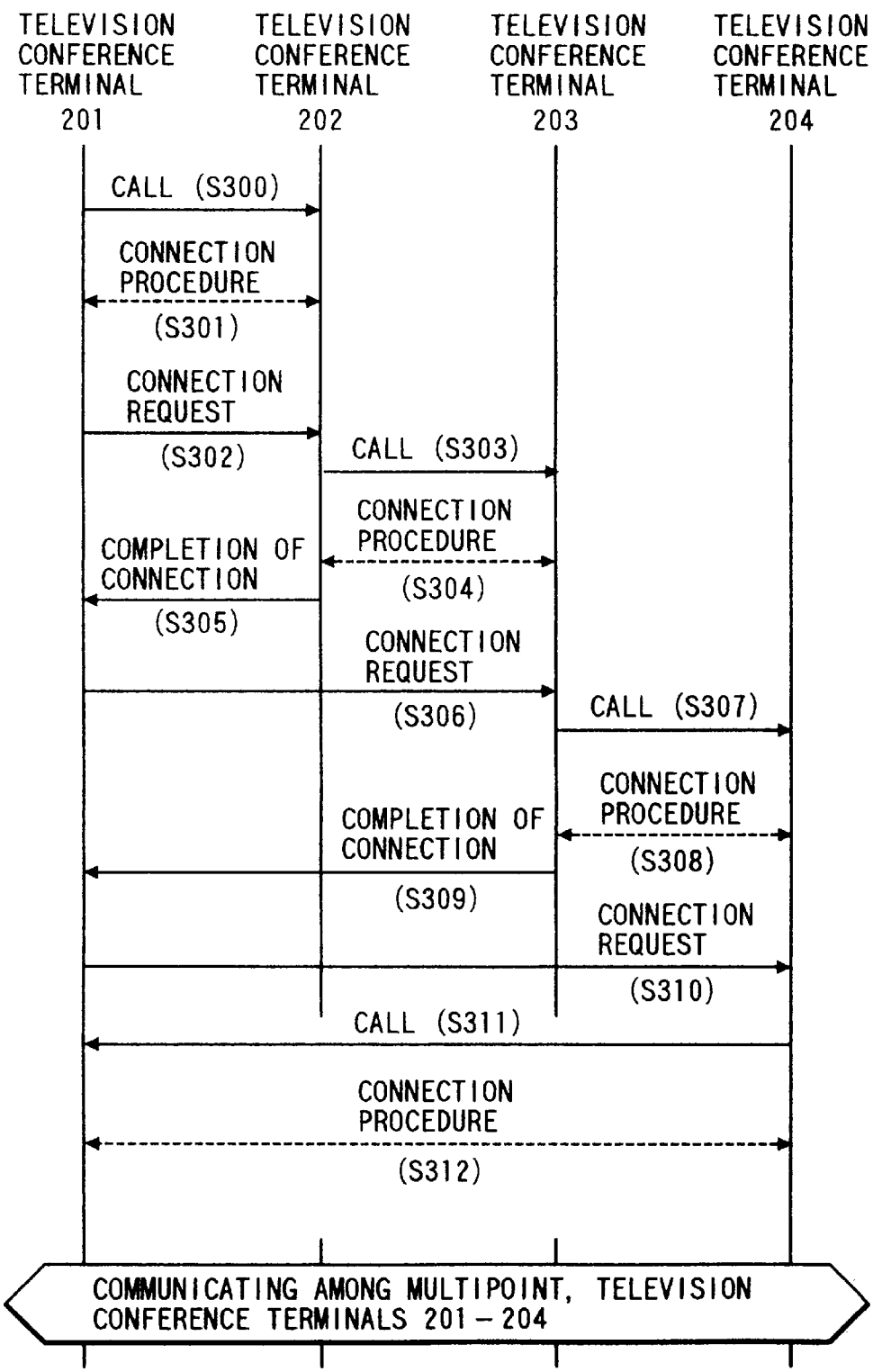
FIG. 3 shows a sequence of a conventional an example of multi-point-to-point connection protocol of the multi-point-to-point connection shown in FIG. 2.
Figure 4:
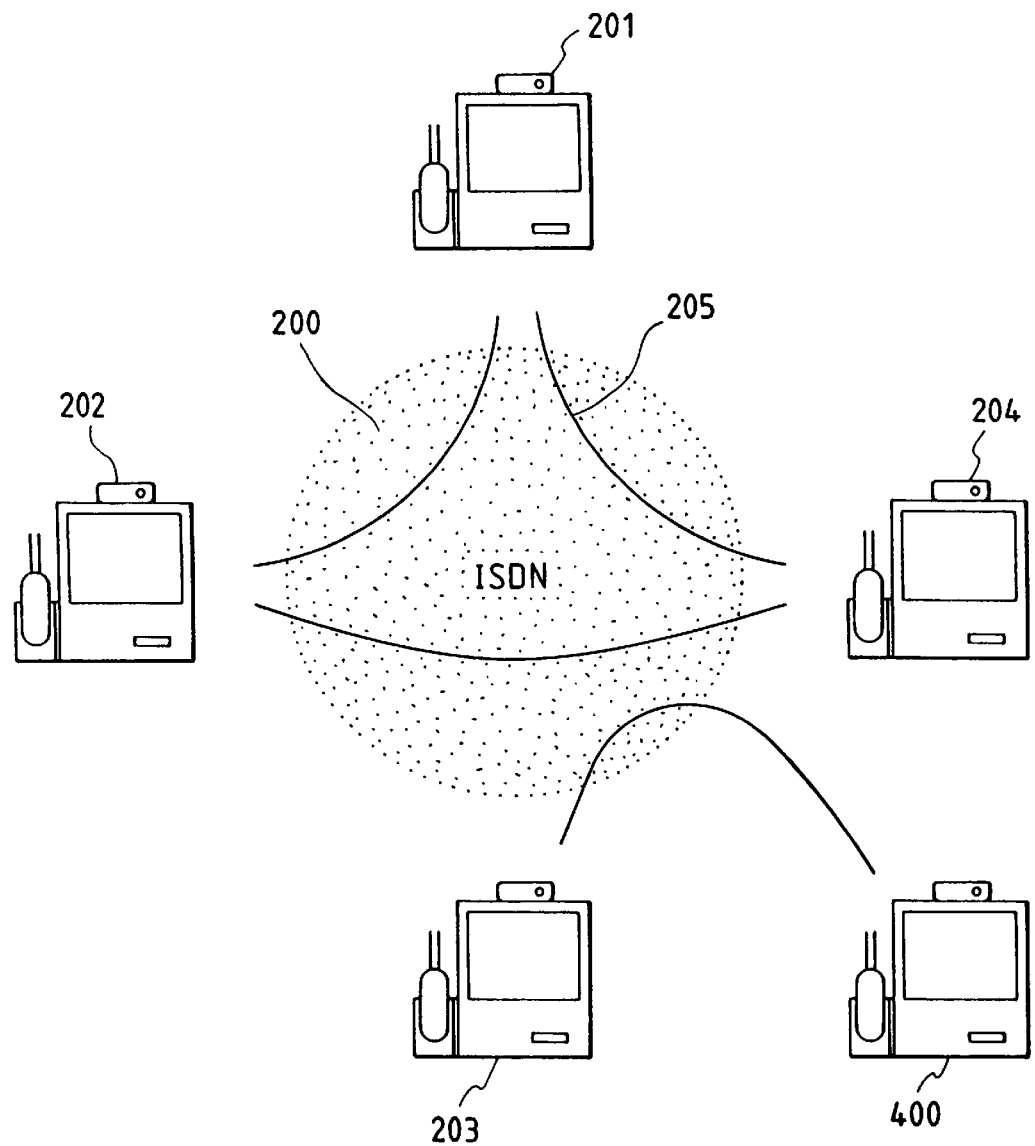
FIG. 4 shows an example of a typical multi-point-to-point connection when a television conference terminal which cannot be multi-point-to-point connected is included.
Figure 5:
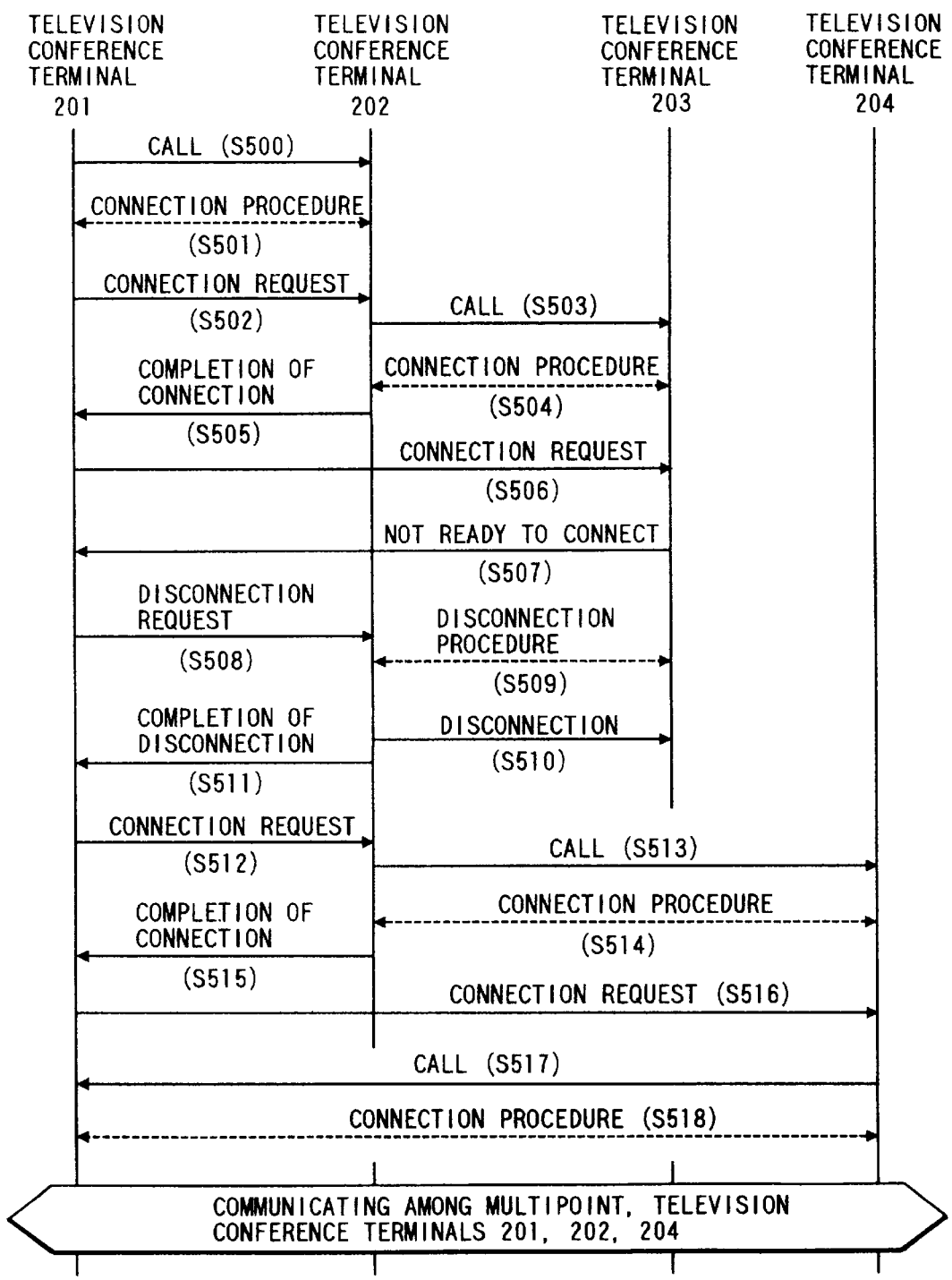
FIG. 5 shows a sequence of a conventional an example of multi-point-to-point connection protocol of the multi-point-to-point connection shown in FIG. 4.

In S808, the multi-point-to-point connection is executed in accordance with the multi-point-to-point connection sequence shown in FIG. 3 in order to conduct the multi-point-to-point connection in accordance with the connection configuration determined in S807.

The connection response reception process shown in FIG. 8 is started each time the correction response message is received in the control television conference terminal.

Figure 9:
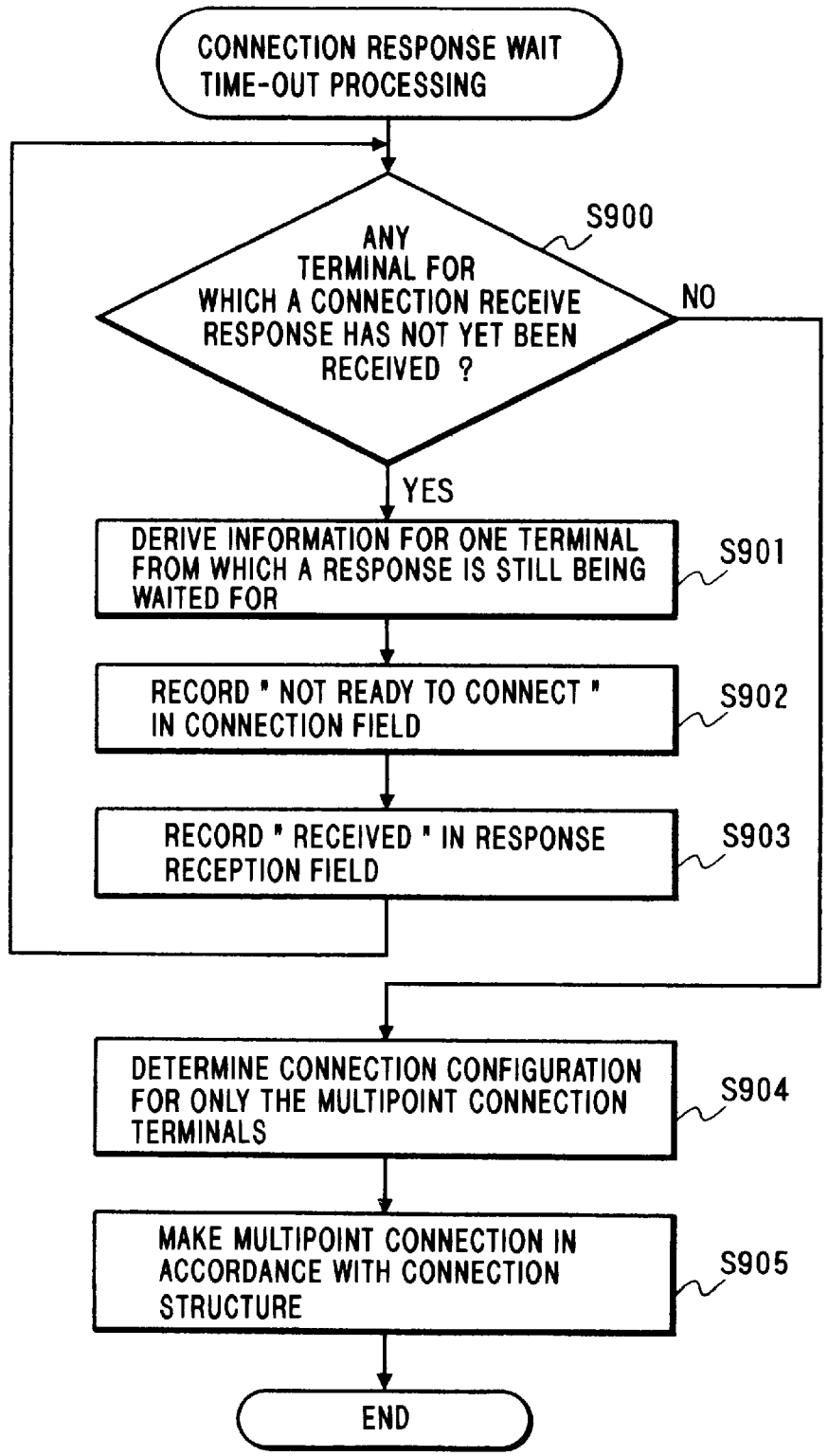
FIG. 9 shows a flow chart of an example of a connection response monitor timeout process in the television conference terminal in accordance with the first embodiment of the present invention.

FIG. 9 shows a flow chart of an example of a process when the connection response monitor set in the flow chart of FIG. 7 is timed out in the control television conference terminal in accordance with the embodiment of the present invention.

In S900, the response reception field 604 is examined, and if the connection response messages have not been received from all participating television conference terminals, the process proceeds to S901 (Yes in S900), and if they have been received, the process proceeds to S904 (No in S900).

In S901, information for one of the participating television conference terminals for which are waiting for the response is being waited for is taken out.

In S902, "not ready to connect" is set to the connection field 605 for the information of the participating television conference terminal taken out in S901.

In S903, "received" is set to the response reception field 604 for the information of the participating television conference terminal taken out in S901.

In S904, the connection configuration for connecting only the television conference terminals which permit the multi-point-to-point connection is determined based on the information of the connection field 605.

In S905, the multi-point-to-point connection is executed in accordance with the multi-point-to-point connection sequence shown in FIG. 3 in order to conduct the multi-point-to-point connection in accordance with the connection configuration determined in S904.

The connection response monitor timeout process shown in FIG. 9 is started when the connection response monitor timer is timed out in the control television conference terminal.

The information of the multi-point-to-point connected terminals is stored in the RAM 3 of FIG. 1 so that it may be checked later by a command from the console unit 4. The conference start and end times are also stored in the RAM. Those information are suitable for use in preparing meeting proceedings later.

Figure 10:
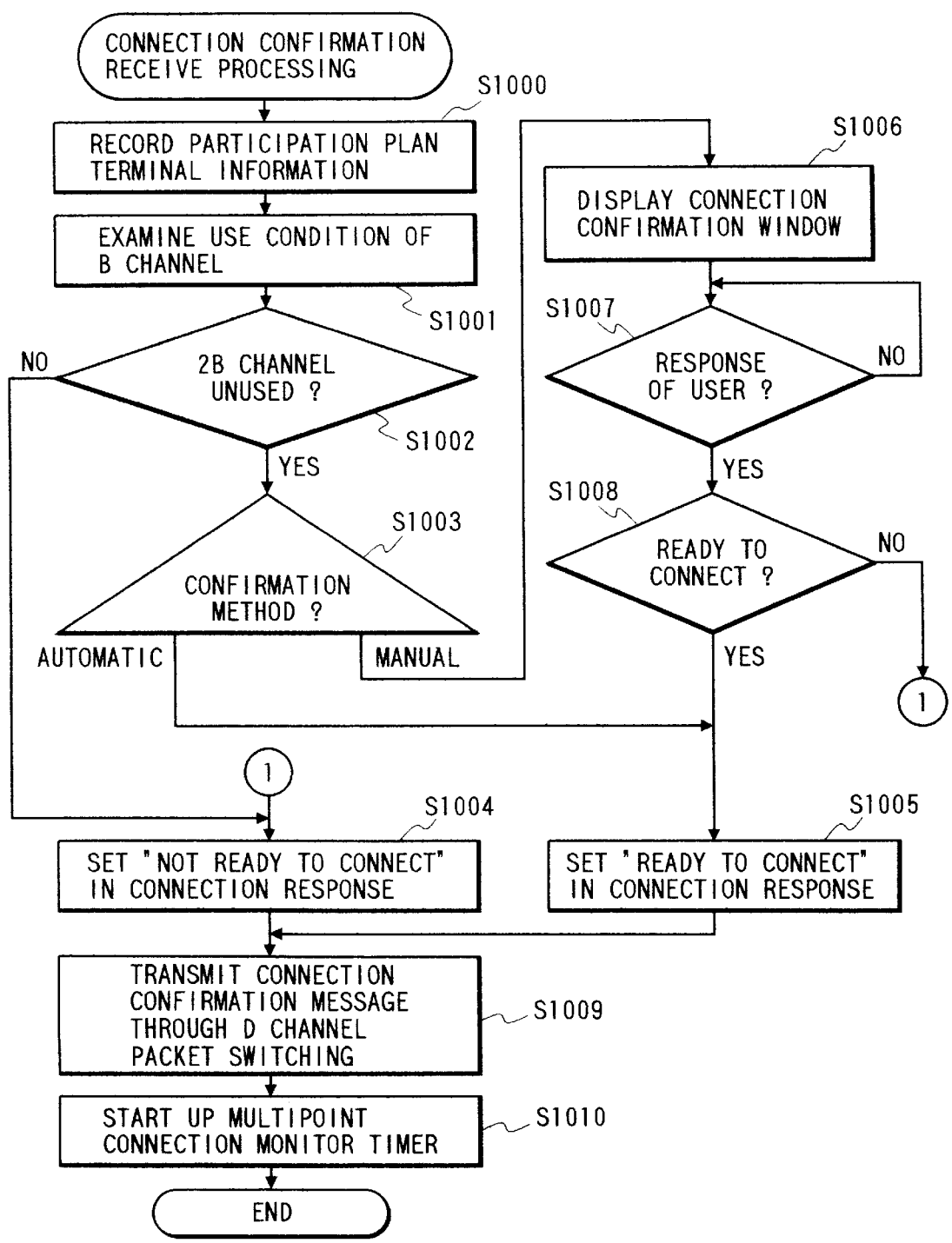
FIG. 10 shows a flow chart of an example of a connection confirmation process in the television conference terminal in accordance with the first embodiment of the present invention.

FIG. 10 shows a flow chart of an example of the connection confirmation reception process in the participating television conference terminal in accordance with the embodiment of the present invention.

In S1000, the information on the participating television conference terminal and the control television conference terminal in which the connection confirmation messages are set is recorded in the RAM 3 of the participating television conference terminal.

In S1001, the use state of the B-channel in the participating television conference terminal (own terminal) is examined.

In S1002, when the result of S1001 indicates that the two B-channels are not used, the process proceeds to S1003 (Yes in S1002), and when one or two B-channels are busy, the process proceeds to S1004 (No in S1002), In S1003, if the connection response method is automatic by the system setting of the participating television conference terminal or the implementation specification, the process proceeds to S1005 (auto in S1003) and if it is manual, the process proceeds to S1006 (manual in S1002).

Figure 11:
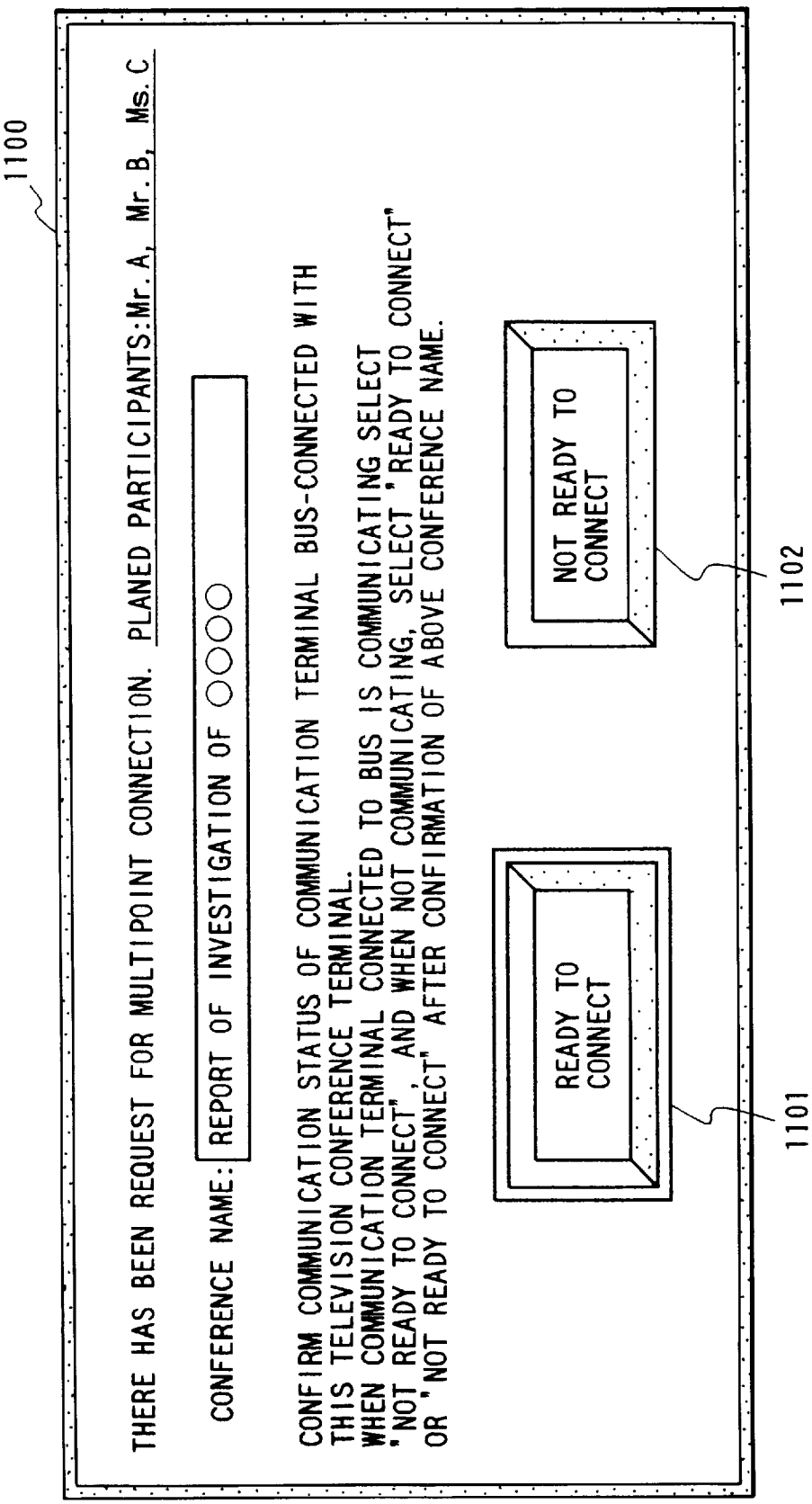
FIG. 11 shows an example of a connection confirmation window in the television conference terminal in accordance with the first embodiment of the present invention.

In S1006, the connection confirmation window as shown by 1100 in FIG. 11 is displayed on the display device of the participating television conference terminal for inquiring the connection to the user.

In S1007, the user response to S1006 is monitored and if the response is received, the process proceeds to S1008 (Yes in S1007), and if the response is not received, the process of S1007 is repeated (No in S1007).

In S1008, if the user response detected in S1007 indicates that the response is "ready to connect", the process proceeds to S1005 (Yes in S1008), and if it indicates "not ready to connect", the process proceeds to S1004 (No in S1008).

In S1005, the multi-point-to-point connection of the participating television conference terminal (own terminal) is set to the connection response message to be transmitted.

In S1004, the fact that the participating television conference terminal cannot be multi-point-to-point connected is set to the connection response message to be transmitted.

In S1009, the connection response message having the multi-point-to-point connection set in S1004 or S1005 is transmitted to the control television conference terminal by establishing the D-channel packet switching path.

In S1010, the multi-point-to-point connection monitor timer for monitoring a call from the participating television conference terminal or the control television conference terminal stored in S1000 is started.

The connection confirmation reception process shown in FIG. 10 is started when the connection confirmation message is received in the participating television conference terminal.

FIG. 11 shows an example of the connection confirmation window displayed in S1004 of FIG. 10 in the participating television conference terminal in accordance with the embodiment of the present invention. A name of the conference and names of participants of the conference derived from the control television conference terminal are displayed on the window.

In FIG. 11, numeral 1100 denotes the connection confirmation window and numeral 1101 denotes a connection ready button for selecting the connection ready for the connection confirmation.

Numeral 1102 denotes a connection not ready button for selecting the connection not ready for the connection confirmation.

Figure 12:
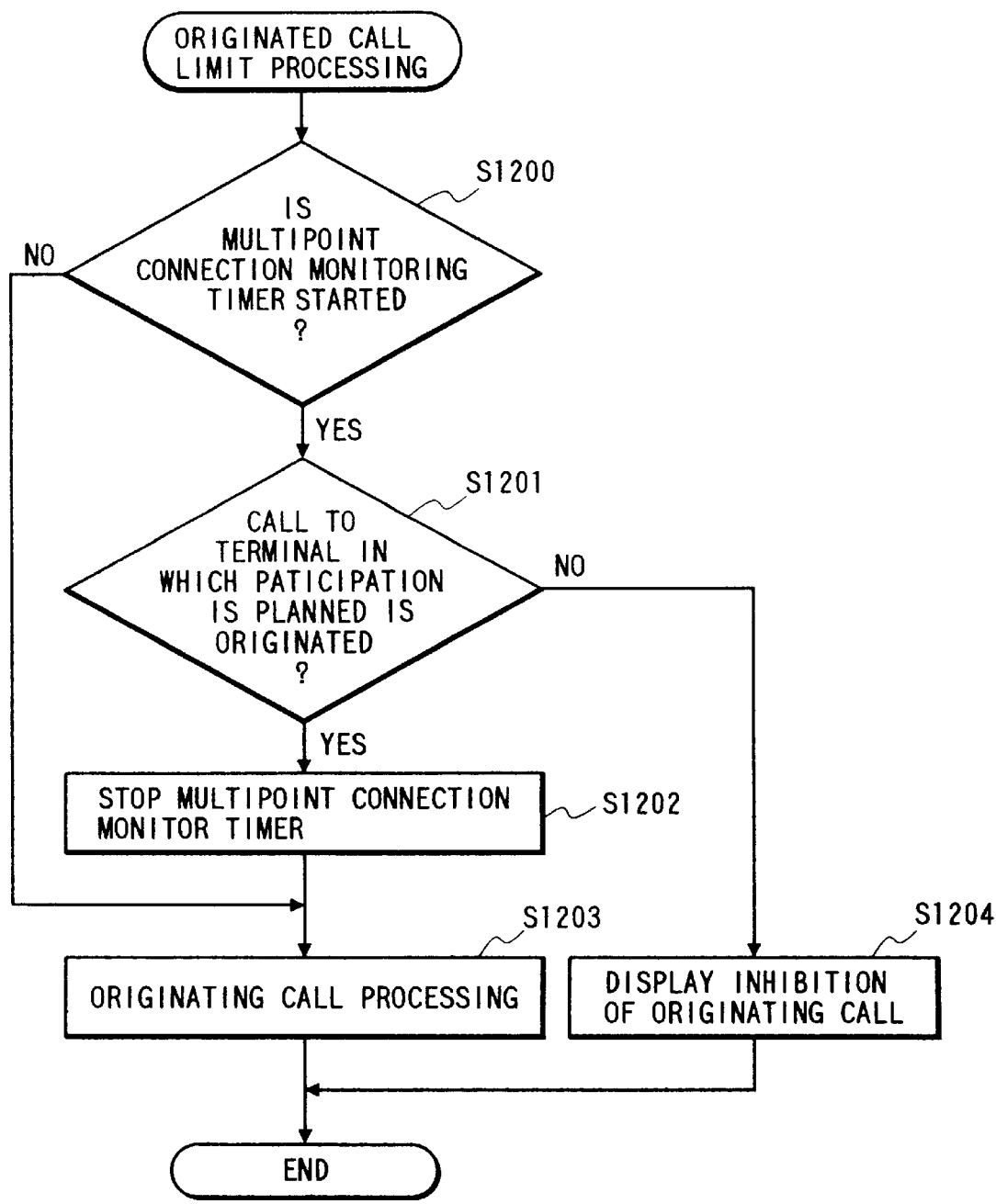
FIG. 12 shows a flow chart of an example of a call restriction process in the television conference terminal in accordance with the first embodiment of the present invention.

FIG. 12 shows a flow chart of an example of a call restriction process in the participating television conference terminal in accordance with the embodiment of the present invention. The following is a process conducted by the CPU of the participating television conference terminal under the program in the ROM 2.

In S1200, the call restriction is monitored to check whether the multi-point-to-point connection monitor timer is in operation or not. If it is in operation, the process proceeds to S1201 (Yes in S1200). If it is not in operation, the process proceeds to S1203 (No in S1200). When it is not in operation, call is made without restriction in accordance with a call command.

In S1201, whether the dial number of a called terminal corresponds to the participating television conference terminal or the control television conference terminal recorded in S1000 of FIG. 10 or not is checked. If they correspond, the process proceeds to S1202 (Yes in S1201). If they do not correspond, the process proceeds to S1204 (No in S1201).

In S1202, the multi-point-to-point connection monitor timer is stopped.

In S1203, the call process is conducted.

Figure 13:
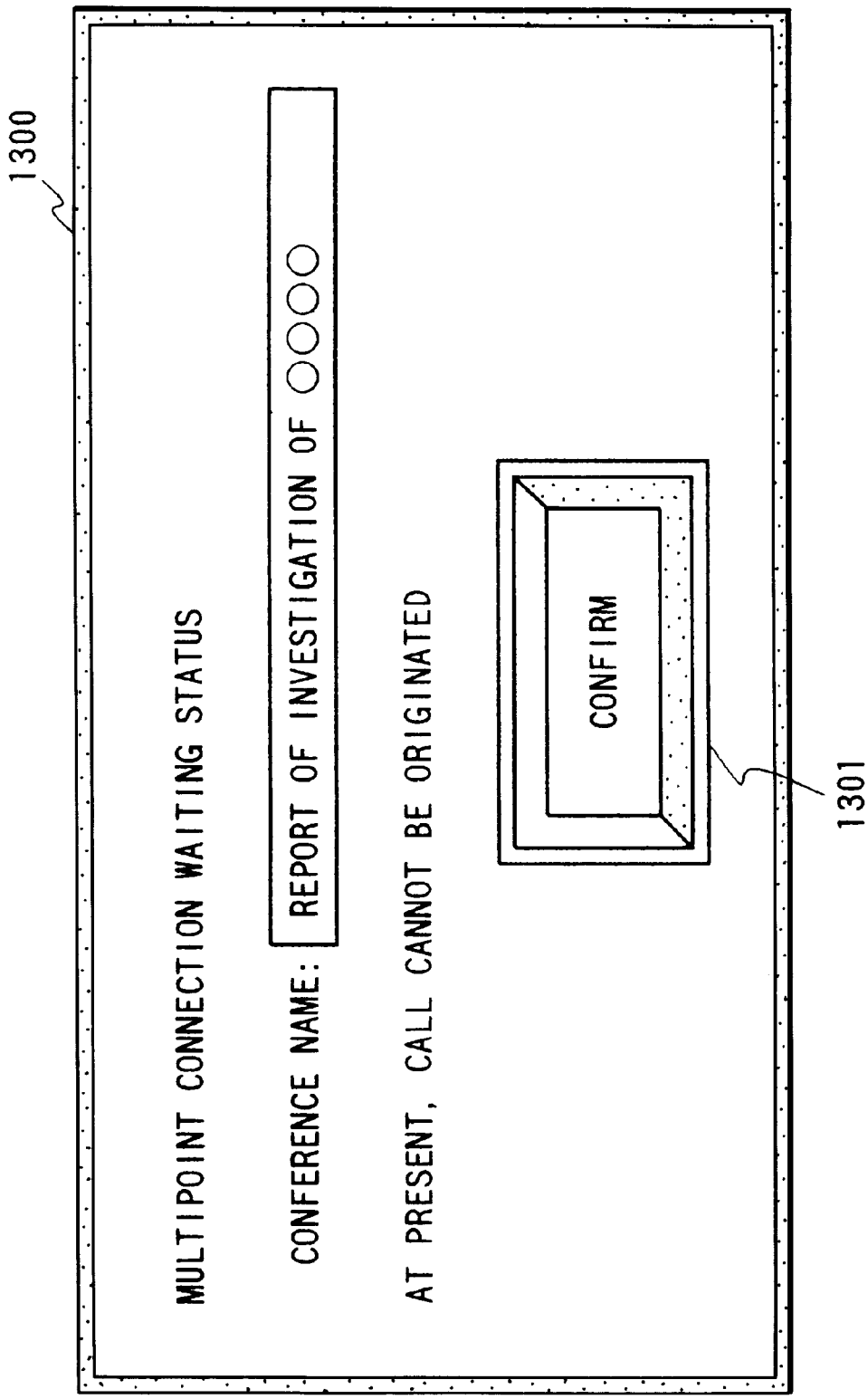
FIG. 13 shows an example of a call inhibition notice window in the television conference terminal in accordance with the first embodiment of the present invention.

In S1204, in order to inform that the call is not permitted to the user other than the participants stored in S1000 who are to participate the television conference, a call inhibit notice window as shown in FIG. 13 is displayed on the image display device of the participating television conference terminal.

The call restriction process shown in FIG. 12 is started when a call is requested by the user in the participating television conference terminal. By the display of the window, an inadvertent call to other than the expected participants to the conference after the confirmation of the non-busy B-channel from the control television conference terminal to the participating television conference terminal and before the start of the conference is prevented.

In the example of the call restriction process shown in FIG. 13, the call to the participating television conference terminal and the control television conference terminal relating to the multi-point-to-point television conference is permitted. However, in order to simplify the control by not permitting the multi-point-to-point connection control by the control television conference terminal, all call requests of other than the control television conference terminal may be rejected regardless of the relation to the multi-point-to-point television conference in order to prevent the communication trigger from the terminal other than the control television conference terminal.

FIG. 13 shows an example of the call inhibit notice window for displaying in S1204 of FIG. 12 in the participating television conference terminal in accordance with the embodiment of the present invention.

In FIG. 13, numeral 1300 denotes the call inhibition notice window and numeral 1301 denotes a confirmation button by which the user inquires the call inhibit notice.

Figure 14:
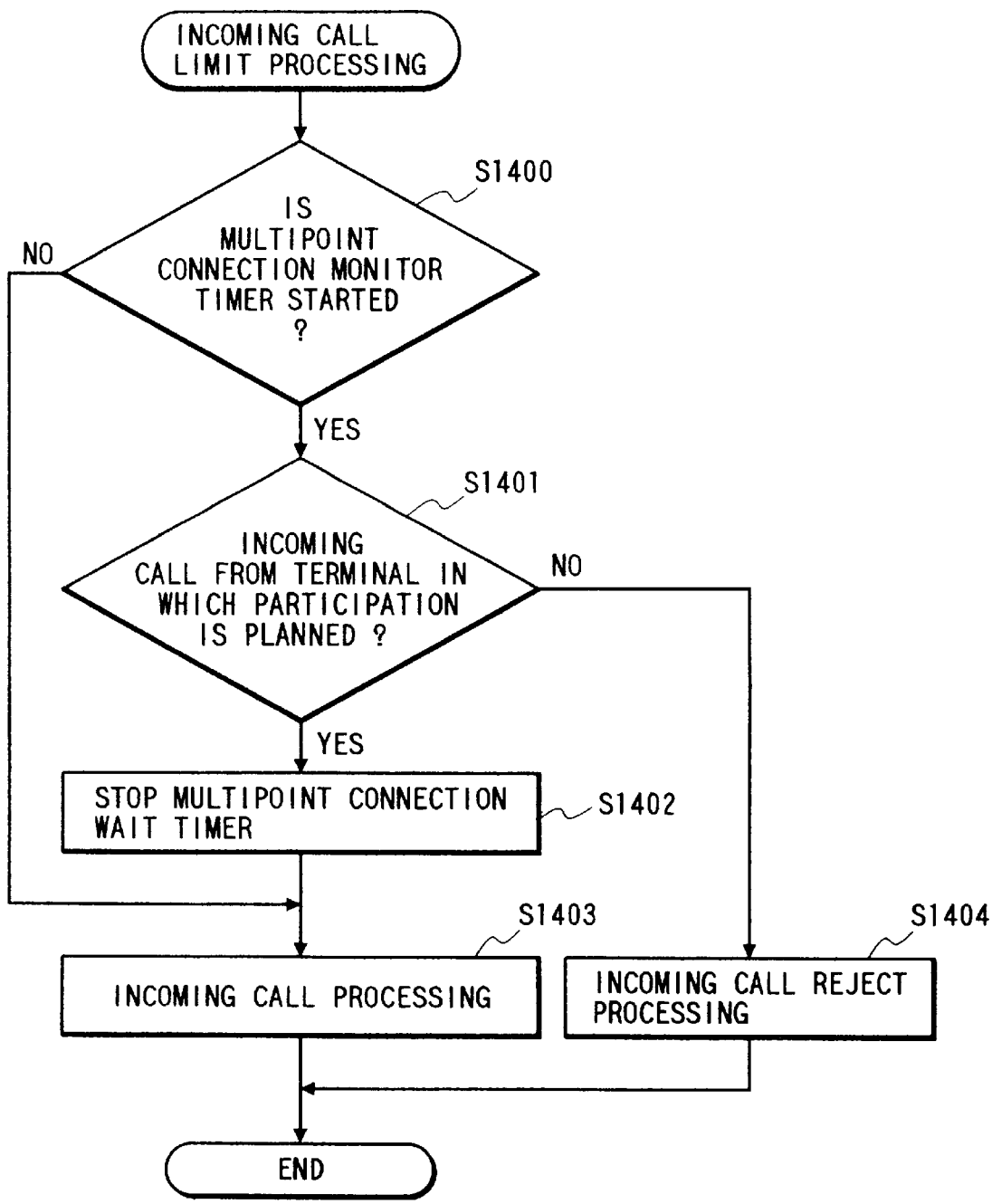
FIG. 14 shows an example of a call restriction process in the television conference terminal in accordance with the first embodiment of the present invention.

FIG. 14 shows a flow chart showing an example of the call restriction process in the participating television conference terminal in accordance with the embodiment of the present invention.

In S1400, whether the multi-point-to-point connection monitor timer is in operation or not is checked, and if it is in operation, the process proceeds to S1401 (Yes in S1400), and if it is not in operation, the process proceeds to S1403 (No in S1400).

In S1401, a dial number of the calling television conference terminal is acquired by examining the calling terminal address number set in the received setup message, whether the dial number corresponds to the participating television conference terminal or the control television conference terminal recorded in S1000 of FIG. 10 or not is checked, and if the dial number corresponds, the process proceeds to S1402 (Yes in S1401), and if the dial number does not correspond, the process proceeds to S1404 (No in S1401).

In S1402, the multi-point-to-point connection monitor timer is stopped.

In S1403, the connection process is conducted.

In S1404, a release message is transmitted to the setup message to reject the call.

The call restriction process shown in FIG. 14 is started when the call is received in the participating television conference terminal.

In the above embodiment, the ISDN basic interface is used although a primary group interface of the ISDN may be used.

In accordance with the present embodiment, the connection confirmation means transmits the connection confirmation message for inquiring whether the B-channel for the participation to the multi-point-to-point television conference is non-busy to all television conference terminals of the expected participants of the multi-point-to-point television conference from the television conference terminal which controls the multi-point-to-point television conference using the D-channel packet switching. The connection acknowledge means acknowledges the connection ready from the television conference terminal which received the connection confirmation message to the television conference terminal which controls the multi-point-to-point television conference when the B-channel to be used for the multipoint-to-point television conference is not busy. The connection acknowledge means also acknowledges the connection not ready when the B-channel to be used for the multi-point-to-point television conference is busy. The multi-point-to-point connection means connects only the television conference terminals for which the connection ready has been communicated by the connection response message connect to connect only the television conference terminals for which the multi-point-to-point connection is ready. Accordingly, when a television conference terminal which is not ready for the multi-point-to-point connection is included in the television conference terminals to be expected to participate in the multi-point-to-point television conference, the time required for the multi-point-to-point connection is shortened compared to that in the prior art multi-point-to-point connection procedure. The charge required for the multi-point-to-point connection process is reduced and the user waiting time is shortened.

In the television conference terminal for controlling the multi-point-to-point television conference, when the connection response message is not received within a predetermined period from the transmission of the connection confirmation message, the connection response monitor means renders the television conference terminal connection not ready so that the waiting of the connection response message for an infinite period is prevented.

Further, the participation information storage means for storing information on all television conference terminals which are to participate the multi-point-to-point television conference in the connection confirmation message and the call restriction means for inhibiting the call to the television conference terminal other than the television conference terminals which are to participate the multi-point-to-point television conference and rejecting the call from the television conference terminal other than the television conference terminals which are to participate the multi-point-to-point television conference when the participation to the multi-point-to-point television conference is permitted are provided so that the multi-point-to-point connection not ready after the transmission of the multi-point-to-point connection ready by the connection response message is avoided.

Further, in the television conference terminal which started the call restriction means, the call restriction monitor means for releasing the call restriction means when the call from the television conference terminal which is to participate the multi-point-to-point television conference is not received within a predetermined period is provided so that the call restriction for an infinite period is prevented.

In addition, in the television conference terminal which received the connection confirmation message, the connection confirmation message display means for informing the reception of the connection confirmation message to the user and the manual connection response means for acknowledging the connection by the user for the connection confirmation message are provided so that when other communication terminal is bus-connected to the line to which the television conference terminal which received the connection confirmation message is connected, the user may check the communication status and manually acknowledge the connection.

In the television conference terminal which received the connection confirmation message, the automatic connection response means for automatically acknowledging connection is provided so that when other communication terminal is not bus-connected to the line to which the television conference terminal which received the connection confirmation message is connected, the connection response may be automatically returned based on the use status of the B-channel of the television conference terminal without user intervention.

As described above, the communication system and the communication apparatus of the communication system which facilitate the communication line connection of the communication system comprising a plurality of communication apparatus do not need wasteful expense for the line connection and do not spend wasteful time are provided.

[Second Embodiment]

A television conference terminal of the communication system and the communication apparatus of the present invention in the multi-point-to-point television conference in accordance with a second embodiment of the present invention is now explained.

Figure 15:
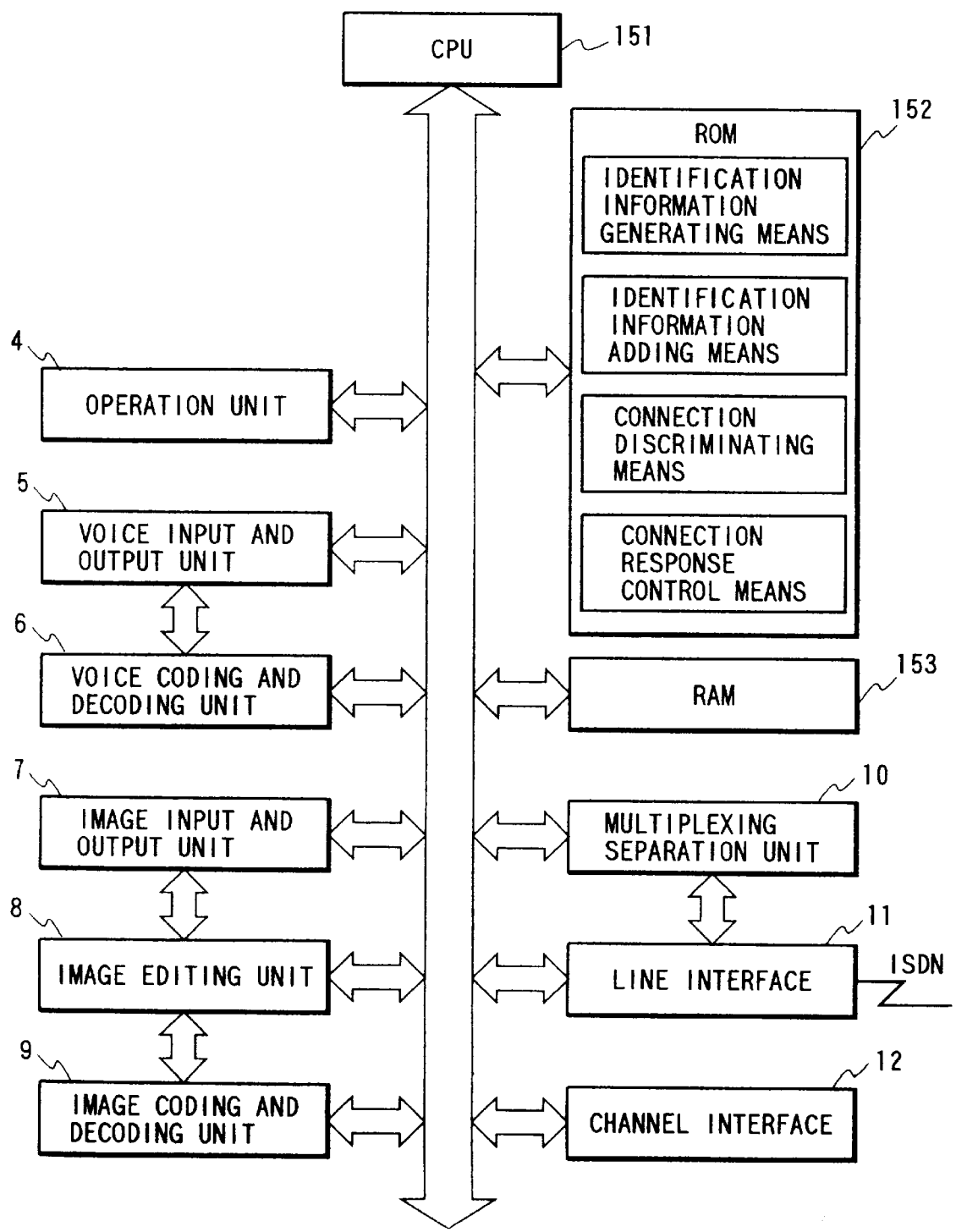
FIG. 15 shows a block diagram of a configuration of the television conference terminal in accordance with a second embodiment of the present invention.

FIG. 15 shows a block diagram of a configuration of a television conference terminal in accordance with the second embodiment of the present invention. The like elements to those shown in FIG. 1 are designated by the like numerals and the description thereof is omitted.

In FIG. 15, numeral 151 denotes a CPU for executing program stored in a ROM 152, numeral 152 denotes the ROM which stores the program for controlling the television conference terminal and program for processing identification information generation means, identification information addition means, connection discrimination means and connection response control means of the present embodiment.

Numeral 153 denotes a RAM which is used as a storage area for various data such as address information of the television conference terminals and a multi-point-to-point connection list and as a work area of the CPU 151.

FIG. 16 shows an example of the multi-point-to-point connection list stored in the RAM 153 and transmitted to a destination television conference terminal after the B-channel connection in the television conference terminal of the present embodiment.

In FIG. 16, numeral 1600 denotes the multi-point-to-point connection list storing the information on the multi-point-to-point connection.

Numeral 1601 denotes a number field which is one element of the multi-point-to-point connection list 1600 for identifying the multi-point-to-point connected individual television conference terminals.

Numeral 1602 denotes an address field which is one element of the multi-point-to-point connection list 1600 for storing an address to call the participating television conference terminal.

Numeral 1603 denotes a connection destination number field which is one element of the multi-point-to-point connection list 1600 for identifying the television conference terminal to be connected nest (designated by the number field 1601).

Numeral 1604 denotes a number of connections field which is one element of the multi-point-to-point connection list 1600 for indicating the number of B-channels which are currently connected. It is initially set to "0".

Numeral 1605 denotes a connection field which is one element of the multi-point-to-point connection list 1600 for indicating whether the multi-point-to-point connection is permitted or not. When the multi-point-to-point connection is not permitted, "not ready to connect" is stored.

In the present embodiment, it is assumed that the multi-point-to-point connection list 1600 shown in FIG. 16 is prepared in the television conference terminal which calls the multi-point-to-point television conference.

Figure 17:
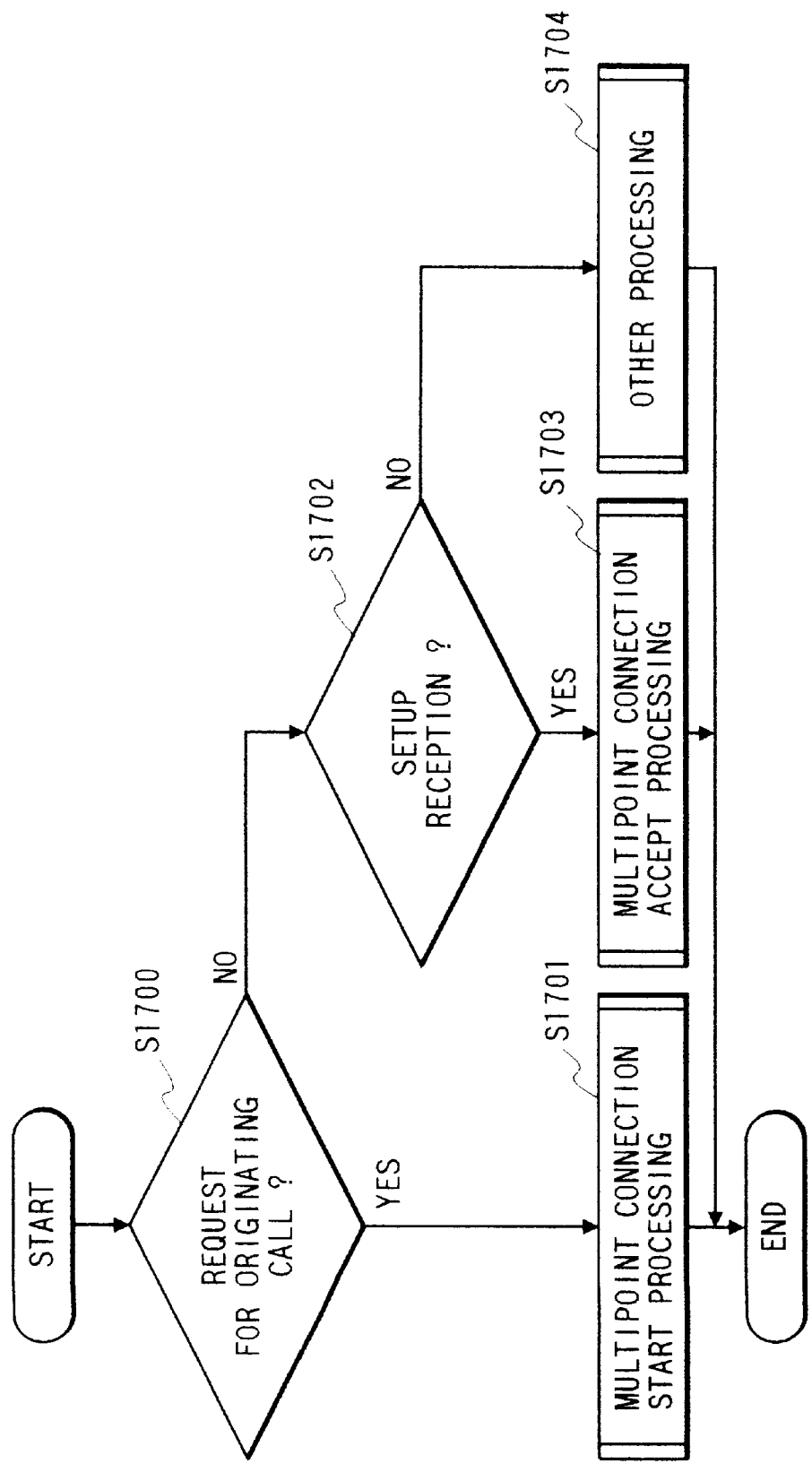
FIG. 17 shows a flow chart of an example of a process in the television conference terminal in accordance with the second embodiment of the present invention.

FIG. 17 shows a flow chart of an example of process in the control television conference terminal in accordance with the present embodiment of the present invention.

The process shown is started when a call request from the user, a call from other television conference terminal (reception of a call setup message) or other event occurs.

In S1700, whether the process was started by the call request of the multi-point-to-point television conference from a user of one television conference terminal or not is checked, and if it was started by the call request, the process proceeds to S1701 (Yes in S1700), otherwise the process proceeds to S1702 (No in S1700).

Figure 18:
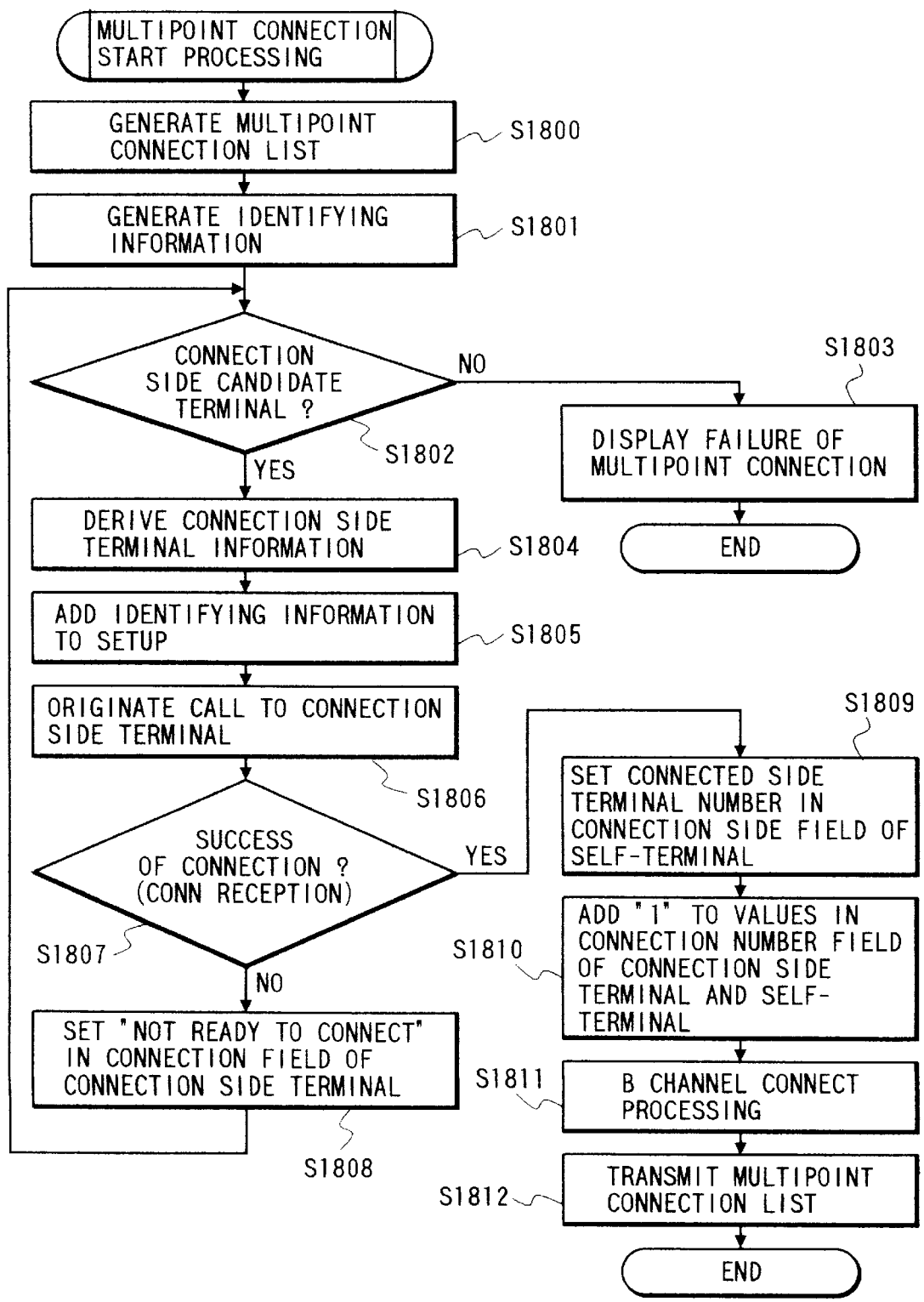
FIG. 18 shows a flow chart of an example of a multi-point-to-point connection start process in the television conference terminal in accordance with the second embodiment of the present invention.

In S1701, a multi-point-to-point connection start process to start the multi-point-to-point connection shown in a flow chart of FIG. 18 is executed and the process is terminated.

In S1702, whether the process was started by the call from other television conference terminal (reception of a call setup message) or not is checked, and if it was started by the call, the process proceeds to S1703 (Yes in S1702), otherwise the process proceeds to S1704 (No in S1702).

Figure 19:
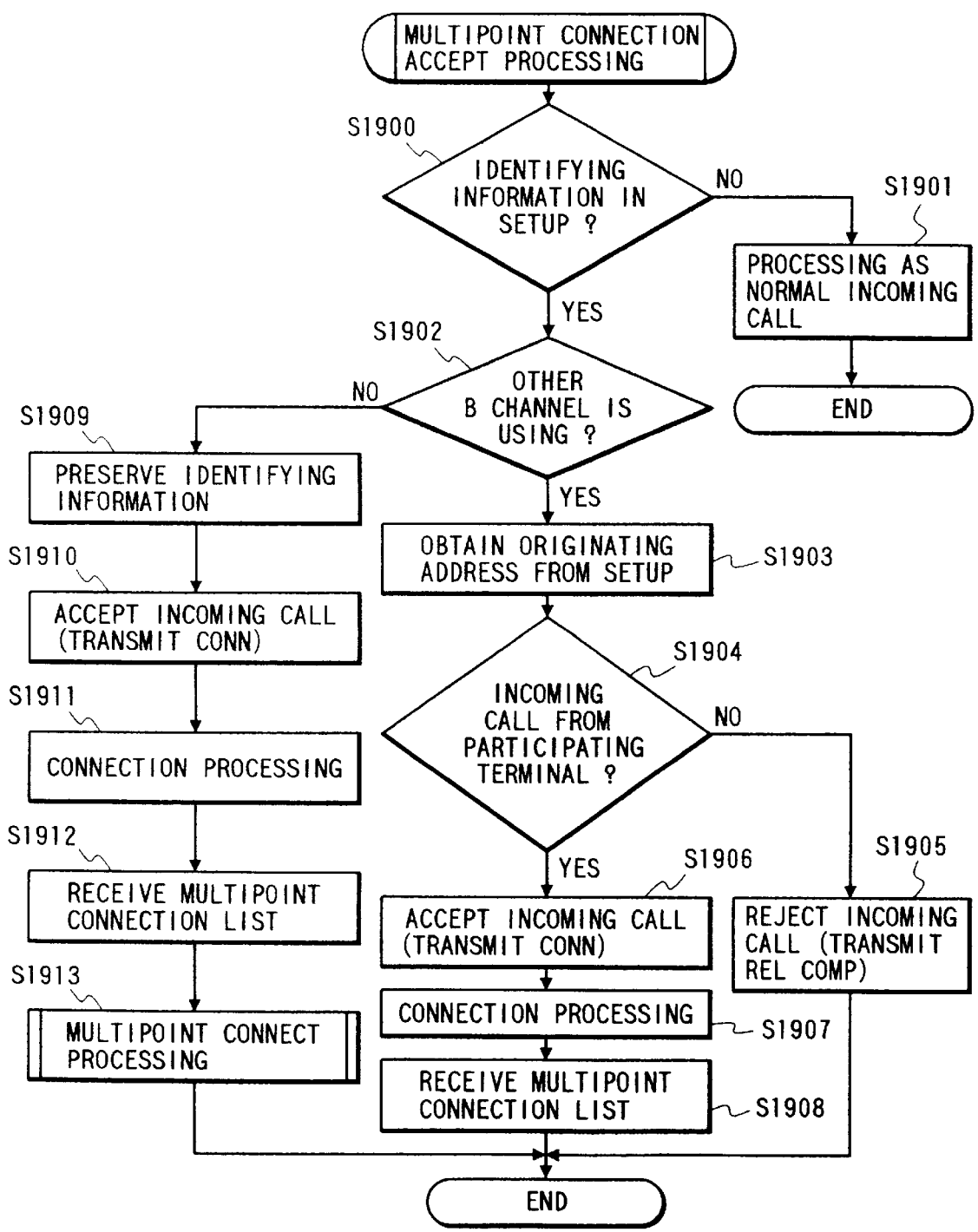
FIG. 19 shows a flow chart of an example of a multi-point-to-point connection acceptance process in the television conference terminal in accordance with the second embodiment of the present invention.

In S1703, a multi-point-to-point connection acceptance process for accepting the multi-point-to-point connection shown in a flow chart of FIG. 19 is executed and the process is terminated.

In S1704, the process of the conventional television conference terminal is executed in accordance with the cause of the start of the process and the process is terminated.

FIG. 18 shows a flow chart of an example of the multi-point-to-point connection start process in the control television conference terminal in accordance with the present embodiment of the present invention.

The process shown in FIG. 18 is started in S1701 of FIG. 17.

In S1800, the multi-point-to-point connection list 1600 shown in FIG. 16 is prepared based on the multi-point-to-point television conference information and the address information stored in the RAM 153 shown in FIG. 15 and an auxiliary storage, not shown, and the process proceeds to S1801.

In S1801, the identification information for the television conference terminal which received the "call setup" message transmitted in S1805 to identify the call received in the multi-point-to-point communication is prepared in the call setup message, and the process proceeds to S1802. For the identification information, a specific value prenoticed to the participating television conference terminal which is to participate the multi-point-to-point television conference is used.

In S1802, whether a connection destination candidate television conference terminal (terminal other than the own television conference terminal having no "not ready to connect" set in the connection field 1605) is present in the multi-point-to-point connection list 1600 or not is checked, and if it is, the process proceeds to S1804 (Yes in S1802), and if it is not, the process proceeds to S1803 (No in S1802).

In S1803, the failure of the multi-point-to-point connection is displayed on the CRT monitor and the process is terminated.

In S1804, the information of the television conference terminal having the smallest value in the number of connections field 1604 is taken out of the connection destination candidate television conference terminals detected in S1802, and the process proceeds to S1805. When there are two or more television conference terminals having the smallest value in the number of connections field 1604, the information of the television conference terminal which has a smaller value in the number field 1601 is taken out.

In S1805, the call setup message for calling the connection destination television conference terminal acquired in S1804 is generated in accordance with the ITU-T Recommendation Q.931 and the identification information generated or taken out in S1801 is added to the message. The identification information is stored in the user information element of the call setup message or the sub-address of the call setup message.

In S1806, call is made to the television conference terminal acquired in S1804 by the call setup message generated in S1805 and the process proceeds to S1807.

In S1807, whether the response (CONN) message was received from the connection destination television conference terminal for the call message transmitted in S1806 or not is checked, and if the response (CONN) message was received, the process proceeds to S1809 (Yes in S1807), and if "release completed (REL COMP)" message was received, the process proceeds to S1808 (No in S1807).

In S1808, "not ready to connect" is set to the connection field 1605 of the multi-point-to-point connection list 1600 corresponding to the television conference terminal which rejected the call request by the call setup message transmitted in S1806, and the process proceeds to S1802.

In S1809, the number corresponding to the connection destination television conference terminal taken out in S1804 is set to the connection destination number field 1603 corresponding to its own television conference terminal of the multi-point-to-point connection list 1600, and the process proceeds to S1810.

In S1810, "1" is added to the number of connection fields 1604 corresponding to the connection destination television conference terminal information of the multi-point-to-point connection list 1600 taken out in S1804 and to the number of connections field 1604 corresponding to its own television conference terminal, and the process proceeds to S1811.

In S1811, a link to transfer the user data is established on the B-channel for which the connection by the D-channel control protocol has been completed in S1807, and the process proceeds to S1812.

In S1812, the multi-point-to-point connection list 1600 prepared in S1800 and updated in S1808, S1809 and S1810 is transmitted to the connection destination television conference terminal by using the link on the B-channel established in S1811, and the process is terminated.

FIG. 19 shows a flow chart of an example of a multi-point-to-point connection acceptance process in the control television conference terminal in accordance with the present embodiment of the present invention.

The process shown is started in S1702 of FIG. 17.

In S1900, whether the identification information indicating that the received message is the call of the multi-point-to-point connection has been added to user information element of the received call setup message or the sub-address or not is checked, and if the identification information has been added, the process proceeds to S1902 (Yes in S1900), and if it has not been added, the process proceeds to S1901 (No in S1900).

In S1901, the received call setup message is processed as the call for a conventional one-to-one communication, and the process is terminated. When the television conference terminal is in the course of multi-point-to-point connection, the call reception for the conventional one-to-one communication may be rejected.

In S1902, the use status of the B-channels excluding the B-channel connected by the received call setup message is checked, and if all of other B-channels are busy, the process proceeds to S1903 (Yes in S1902), and if there is a non-busy B-channel, the process proceeds to S1910 (No in S1902).

In S1903, the address of the source television conference terminal of the call setup message is acquired from the source address of the received call setup message, and the process proceeds to S1904.

In S1904, whether the television conference terminal is in the course of multi-point-to-point connection and the address of the source television conference terminal of the call setup message acquired in S1903 is included in the multi-point-to-point connection list 1600 under connection or not is checked, and if it is included, the process proceeds to S1906 (Yes in S1904), and if it is not included, the process proceeds to S1906 (Yes in S1904), and if it is not included, the process proceeds to S1905 (No in S1904). The inclusion of the address of the source terminal of the call setup message in the multi-point-to-point connection list under connection means that the received call is the last one to complete the ring-shaped multi-point-to-point connection.

In S1905, the "release complete (REL COMP)" message is sent back for the received call setup message to reject the call, and the process is terminated.

In S1906, the "response (CONN)" message is sent back for the received call setup message to accept the call, and the process proceeds to S1907.

In S1907, the link to transfer the user data is established on the B-channel for which the connection by the D-channel control protocol has been completed by the transmission of the "response" message in S1906, and the process proceeds to S1908.

In S1908, the multi-point-to-point connection list 1600 transmitted from the connected television conference terminal over the link on the B-channel established in S1907 is received and stored, and the process is terminated.

In S1909, the identification information for identifying the multi-point-to-point communication is taken out of the received call setup message and it is stored in the RAM 153 of the television conference terminal, and the process proceeds to S1910.

In S1910, the response message is sent back for the received call setup message to accept the call, and the process proceeds to S1911.

In S1911, the link to transfer the user data is established on the B-channel for which the connection by the D-channel control protocol has been completed by transmitting the response message in S1910.

In S1912, the multi-point-to-point connection list 1600 transmitted from the connected television conference terminal over the link on the B-channel established in S1911 is received and stored, and the process proceeds to S1913.

Figure 20:
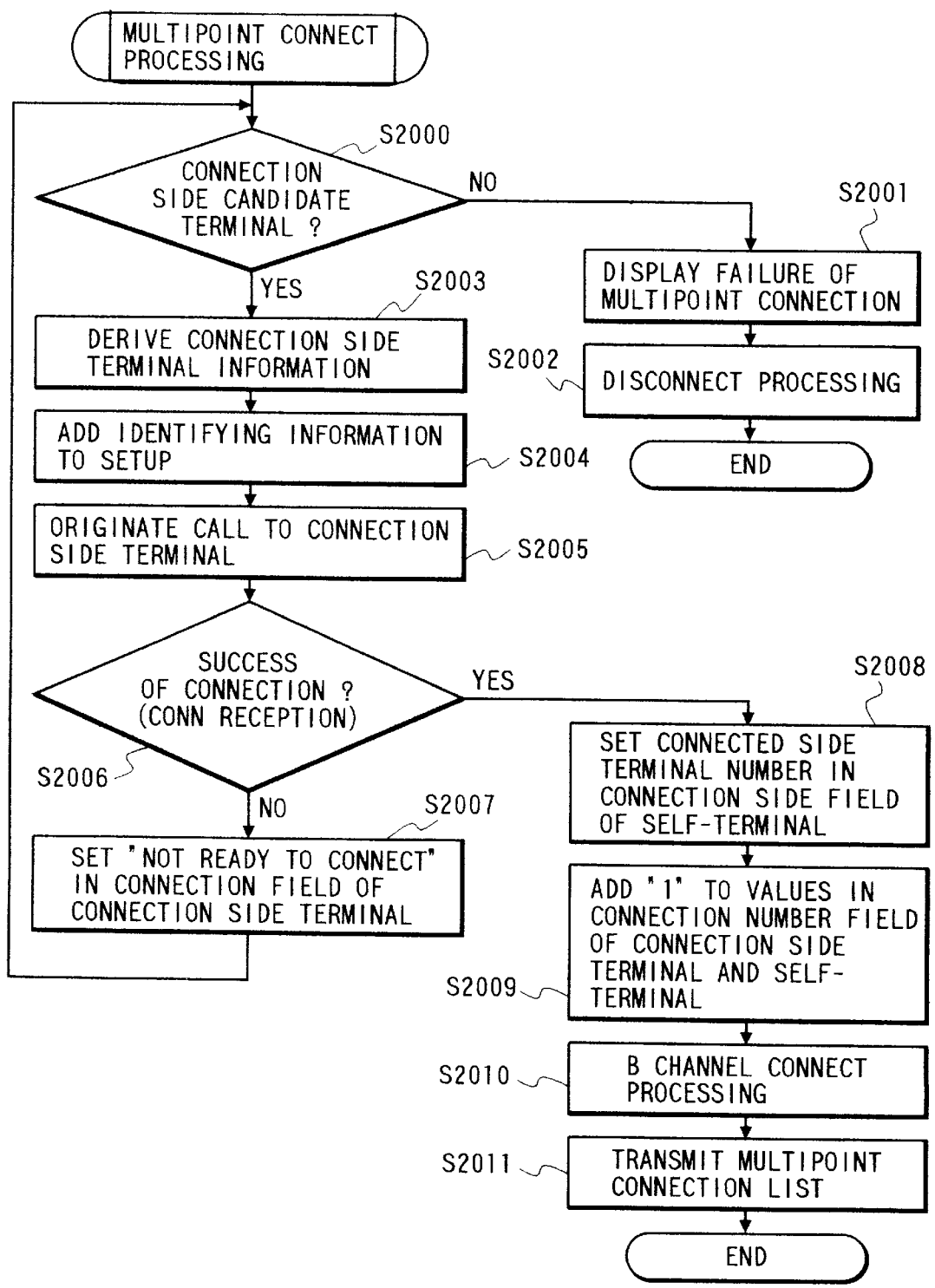
FIG. 20 shows a flow chart of an example of a multi-point-to-point connection process in the television conference terminal in accordance with the second embodiment of the present invention.

In S1913, the multi-point-to-point connection process shown in FIG. 20 is executed to connect the next television conference terminal which is to participate the multi-point-to-point communication, and the process is terminated.

FIG. 20 shows a flow chart of an example of the multi-point-to-point connection process in the participating television conference terminal in accordance with the present embodiment of the present invention.

The process shown is started in S1913 of FIG. 19.

In S2000, whether the connection destination candidate television conference terminal (terminal other than the own television conference terminal having no "connection not ready" set in the connection field 1605) is present in the multi-point-to-point connection list received in S1912 of FIG. 19 and stored in the RAM 153 or not is checked, and if it is included, the process proceeds to S2103 (Yes in S2000), and if it is not included, the process proceeds to S2001 (No in S2000).

In S2001, the failure in the multi-point-to-point connection is displayed on the CRT monitor and the process proceeds to S2002.

In S2002, the multi-point-to-point connection connected in S1910 of FIG. 19 is disconnected and the process is terminated. In the television conference terminal having the multi-point-to-point connection disconnected by this step, if the multi-point-to-point connection completed in the B-channel other than the disconnected B-channel is present, that B-channel is disconnected.

In S2003, the information of the television conference terminal having the smallest value in the number of connections field 1604 is taken out of the connection destination candidate television conference terminals detected in S2000, and the process proceeds to S2004. When there are two or more television conference terminals having the smallest value in the number of connections field 1604, the information of the television conference terminal having a smaller value in the number field 1601 is taken out.

In S2004, the call setup message for calling the connection destination television conference terminal acquired in S2003 is generated in accordance with the ITU-T Recommendation Q.931 and the identification information stored in S1909 of FIG. 19 is added to the message. The identification information is stored in the user information element of the setup message or the sub-address of the setup message.

In S2005, call is made to the connection destination television conference terminal taken out in S2003 by the call setup message generated in S2004, and the process proceeds to S2006.

In S2006, whether the response message has been received from the connection destination television conference terminal for the call setup message transmitted in S2005 or not is checked, and if the message has been received, the process proceeds to S2008 (Yes in S2006), and if the release complete message has been received, the process proceeds to S2007 (No in S2006).

In S2007, the "connection not ready" is set to the connection field 1605 of the multi-point-to-point connection list corresponding to the television conference terminal which rejected the call request by the call setup message transmitted in S2005, and the process proceeds to S2000.

In S2008, the number corresponding to the connection destination television conference terminal taken out in S2003 is set to the connection destination number field 1603 of the multi-point-to-point connection list 1600 corresponding to its own television conference terminal, and the process proceeds to S2009.

In S2009, "1" is added to the field corresponding to the connection destination television conference terminal information taken out in S2003 from the number of connections field 1604 of the multi-point-to-point connection list 1600 and the field corresponding to its own television conference terminal, and the process proceeds to S2010.

In S2010, the ink to transfer the user data is established on the B-channel for which the connection by the D-channel control protocol has been completed in S1006, and the process proceeds to S2011.

In S2011, the multi-point-to-point connection list 1600 received and stored in S1912 and updated in S2007, S2008 and S2009 is transmitted to the connection destination television conference terminal by using the link on the B-channel established in S2010, and the process is terminated.

In the second embodiment, the ISDN basic interface is used although the ISDN primary group interface may be used.

In the first and second embodiments although the television conference is particularly discussed, the present invention may be applied to other digital communication such as television telephone and computer communication.

In accordance with the present embodiment, the multi-point-to-point communication system connected to the ISDN for transferring the multi-point-to-point connection list containing the communication terminal information participating the multi-point-to-point communication to permit the multi-point-to-point communication by determining the connection destination communication terminal based on the received multi-point-to-point connection list comprises identification information generation means for generating the information for identifying the multi-point-to-point communication, identification information addition means for adding the identification information generated by the identification information generation means to the call setup message, the connection discrimination means for determining whether the communication terminal is ready for the multi-point-to-point connection or not when the identification information has been added to the received setup message, and the connection response control means for acknowledging by the response (CONN) message (for the connection ready) or the release complete message (for the connection not ready) in accordance with the result of the connection discrimination means. Since only the communication terminals which are ready for the multi-point-to-point connection are connected, when the communication terminal which is not ready for the multi-point-to-point connection is included in the communication terminals which are to participate the multi-point-to-point communication, the time required for the multi-point-to-point connection is shortened compared with the prior art multi-point-to-point connection protocol, the charge required for the multi-point-to-point connection process is reduced and the user wait time is shortened.

The present invention may be implemented by supplying a program code of software for implementing the functions of the above embodiments to a computer in an apparatus or system connected with various devices to operate the devices to implement the above embodiments and operating the devices in accordance with the program stored in the computer (CPU or MPU) of the system or the apparatus.

In this case, the program code per se of the software implements the functions of the embodiments and the program code per se and means for supplying the program code to the computer such as a storage medium storing such program code constitute the present invention.

As the storage medium for storing such program code, a floppy disk, a hard disk, an optical disk, an magneto-optical disk, a CD-ROM, a magnetic tape, a nonvolatile memory card or a ROM may be used.

The functions of the embodiments may be attained by executing the supplied program code by the computer, or the functions of the embodiments may be attained by the cooperation of the program code with an OS (operating system) for the computer or other application software, and such software is within the embodiments of the present invention.

The supplied program code may be stored in a memory of an extended functional board of the computer or an extended functional unit connected to the computer and a CPU in the extended functional board or the extended functional unit may conduct a portion of or all of the actual process in accordance with the instructions of the program code so that the functions of the embodiments are attained.

What is claimed is:

1. A communication system for facilitating communication among a plurality of communication terminals, at least one of the communication terminals comprising:

confirmation means for inquiring to another communication terminal about use status of a data channel owned by the other communication terminal using a control channel;

control means for connecting a communication line among the plurality of communication terminals in accordance with a confirmation result provided by said confirmation means; and inhibiting means for inhibiting a call to a communication terminal other than the communication terminal for which non-busy status of the data channel has been confirmed by said confirmation means, wherein a restriction is released by said inhibiting means when no call is received from the other communication terminal within a predetermined period, and wherein the other communication terminal comprises informing means for communicating the use status of the data channel in response to the inquiry from said confirmation means.

2. A communication terminal for use in a communication system for communicating among a plurality of communication terminals, comprising:

confirmation means for inquiring to another communication terminal about use status of a data channel occupied by the other communication terminal using a control channel;

control means for connecting a communication line among the plurality of terminals in accordance with a confirmation result provided by said confirmation means; and inhibiting means for inhibiting a call to a communication terminal other than the communication terminal for which non-busy status of the data channel has been confirmed by said confirmation means, wherein a restriction is released by said inhibiting means when no call is received from the other communication terminal within a predetermined period.

3. A communication terminal according to claim 2, wherein the control channel is a D-channel.

4. A communication terminal according to claim 2, wherein the data channel is a B-channel.

5. A communication terminal according to claim 2, wherein the confirmation result is a confirmation communication using D-channel packet switching.

6. A communication terminal according to claim 2, wherein the data channel is a pay channel.

7. A communication terminal according to claim 2, wherein the control channel is a least charged channel.

8. A communication system for facilitating communication among a plurality of communication terminals, at least one of the communication terminals comprising:

confirmation means for inquiring to another communication terminal about use status of a data channel owned by the other communication terminal using a control channel; and control means for connecting a communication line among the plurality of communication terminals in accordance with a confirmation result provided by said confirmation means, wherein said control means connects the communication line when the confirmation result indicates that the data channel is connection-ready so that channel charge is reduced, and wherein the other communication terminal comprises informing means for automatically communicating the use status of the data channel in accordance with a confirmation inquiry from said confirmation means.

9. A communication system according to claim 8, wherein the control channel is a D-channel.

10. A communication system according to claim 8, wherein the data channel is a B-channel.

11. A communication system according to claim 8, wherein the confirmation result is a confirmation communication using D-channel packet switching.

12. A communication system according to claim 8, wherein the data channel is a pay channel.

13. A communication system according to claim 8, wherein the control channel is a least charged channel.

14. A communication terminal for use in a communication system for communicating among a plurality of communication terminals comprising:

receiving means for receiving a confirmation inquiry for use status of a data channel transmitted from another communication terminal through a control channel; and informing means for automatically informing the other communication terminal of the use status of the data channel in accordance with the confirmation inquiry received by said receiving means, wherein a communication line is connected between the communication terminals when the use status indicates that the data channel is connection-ready so that channel charge is reduced.

15. A communication terminal according to claim 14, wherein the control channel is a D-channel.

16. A communication terminal according to claim 14, wherein the data channel is a B-channel.

17. A communication terminal according to claim 14, wherein the confirmation result is a confirmation communication using D-channel packet switching.

18. A communication terminal according to claim 14, wherein the data channel is a pay channel.

19. A communication terminal according to claim 14, wherein the control channel is a least charged channel.

20. A method for a communication system for facilitating communication among a plurality of communication terminals, said method comprising the steps of:

inquiring, from one communication terminal, to another communication terminal about use status of a data channel owned by the other communication terminal using a control channel;

inhibiting a call to a communication terminal other than the communication terminal for which non-busy status of the data channel has been confirmed in said inquiring step;

calling and connecting a communication line among the communication terminals in accordance with a confirmation result obtained in said inquiring step; and releasing a restriction when no call is received from the other communication terminal within a predetermined period, wherein the other communication terminal communicates the use status of the data channel in response to the inquiry in said inquiring step.

21. A method for a communication terminal for use in a communication system for communicating among a plurality of communication terminals, said method comprising the steps of:

inquiring, from one communication terminal, to another communication terminal about use status of a data channel occupied by the other communication terminal using a control channel;

inhibiting a call to a communication terminal other than the communication terminal for which non-busy status of the data channel has been confirmed in said inquiring step;

calling and connecting a communication line among the communication terminals in accordance with a confirmation result obtained in said inquiring step; and releasing a restriction when no call is received from the other communication terminal within a predetermined period.

22. A method for a communication system for facilitating communication among a plurality of communication terminals, said method comprising the steps of:

inquiring, from one communication terminal, to another communication terminal about use status of a data channel owned by the other communication terminal using a control channel; and connecting a communication line among the plurality of communication terminals in accordance with a confirmation result obtained in said inquiring step, wherein the other communication terminal automatically communicates the use status of the data channel in accordance with a confirmation inquiry sent in said inquiring step.

23. A method for a communication terminal for use in a communication system for communicating among a plurality of communication terminals, said method comprising the steps of:

receiving a confirmation inquiry for use status of a data channel transmitted from another communication terminal through a control channel; and automatically informing the other communication terminal of the use status of the data channel in accordance with the confirmation inquiry received in said receiving step.

24. A computer-useable medium storing computer-useable instructions for controlling a communication system for facilitating communication among a plurality of communication terminals, the instructions comprising:

instructions for inquiring, by one communication terminal, to another communication terminal about use status of a data channel owned by the other communication terminal using a control channel;

instructions for connecting a communication line among the plurality of communication terminals in accordance with a confirmation result provided in response to execution of said inquiring instructions; and instructions for inhibiting a call to a communication terminal other than the communication terminal for which non-busy status of the data channel has been confirmed in response to execution of said inquiring instructions for releasing a restriction when no call is received from the other communication terminal within a predetermined period; and wherein said inquiring instructions include instructions for receiving the use status of the data channel communicated from the other communication terminal in response to the inquiry provided in response to execution of said inquiring instructions.

25. A computer-useable medium storing computer-useable instructions for controlling a communication terminal for use in a communication system for communicating among a plurality of communication terminals, the instructions comprising:

instructions for inquiring, by one communication terminal, to another communication terminal about use status of a data channel occupied by the other communication terminal using a control channel;

instructions for connecting a communication line among the plurality of terminals in accordance with a confirmation result provided in response to execution of said inquiring instructions; and instructions for inhibiting a call to a communication terminal other than the communication terminal for which non-busy status of the data channel has been confirmed in response to the execution of said inquiring instructions; and instructions for releasing a restriction when no call is received from the other communication terminal within a predetermined period.

26. A computer-useable medium storing computer-useable instructions for controlling a communication system for facilitating communication among a plurality of communication terminals, the instructions comprising:

instructions for inquiring, by one communication terminal, to another communication terminal about use status of a data channel owned by the other communication terminal using a control channel; and instructions for connecting a communication line among the plurality of communication terminals in accordance with a confirmation result provided in response to the execution of said inquiring instructions;

wherein said connecting instructions connect the communication line when the confirmation result indicates that the data channel is connection ready so that channel charge is reduced, and wherein said inquiring instructions include instructions for receiving the use status of the data channel automatically communicated from the other communication terminal in response to the inquiry provided in response to execution of said inquiring instructions.

27. A computer-useable medium storing computer-useable instructions for controlling a communication terminal for use in a communication system for communicating among a plurality of communication terminals, the instructions comprising:

instructions for receiving a confirmation inquiry for use status of a data channel transmitted from another communication terminal through a control channel; and instructions for automatically informing the other communication terminal of the use status of the data channel in accordance with the confirmation inquiry received during the execution of said receiving instructions.

28. A communication system for facilitating communication among a plurality of communication terminals, at least one of the communication terminals comprising:

confirmation means for inquiring to another communication terminal about use status of a data channel owned by the other communication terminal, using a control channel; and control means for connecting a communication line among the plurality of communication terminals in accordance with a confirmation result provided by said confirmation means, wherein said control means connects the communication line when the confirmation result indicates that the data channel is connection-ready so that channel charge is reduced, wherein the other communication terminal comprises informing means for informing the use status of the data channel in response to the inquiry from said confirmation means, wherein said communication terminal further comprises inhibiting means for inhibiting a call to a communication terminal other than the communication terminals for which non-busy status of the data channel has been confirmed by said confirmation means, and wherein said communication terminal releases a restriction by said inhibiting means when no call is received from the other communication terminal within a predetermined period.

29. A communication system for facilitating communication among a plurality of communication terminals, at least one of the communication terminals comprising:

confirmation means for inquiring to another communication terminal about use status of a data channel owned by the other communication terminal, using a control channel; and control means for connecting a communication line among the plurality of communication terminals in accordance with a confirmation result provided by said confirmation means, wherein said control means connects the communication line when the confirmation result indicates that the data channel is connection-ready so that channel charge is reduced, wherein the other communication terminal comprises informing means for informing the use status of the data channel in response to the inquiry from said confirmation means, and wherein said informing means automatically communicates the use status of the data channel in accordance with a confirmation inquiry from said confirmation means.

30. A communication system connected to a digital line for transferring a multi-point-to-point connection list storing communication terminal information for participating multi-point-to-point communications and determining a connection destination communication terminal based on the received multi-point-to-point connection list to permit multi-point-to-point communication, comprising:

identification information generation means for generating information for identifying multi-point-to-point communication;

identification information addition means for adding the identification information generated by said identification information generation means to a call setup message;

connection discrimination means for determining whether a communication terminal is ready for multi-point-to-point connection using received identification information added to the call setup message; and connection response control means for acknowledging by a response message or a release complete message in accordance with a discrimination result provided by said connection discrimination means, wherein said connection discrimination means determines a connection-ready state when at least one non-busy B-channel (information channel) other than a B-channel for accepting a call is present or when a B-channel other than the B-channel for accepting the call which is connected to a communication terminal participating the multi-point-to-point connection is present.

31. A communication system according to claim 30, wherein said identification information addition means adds the identification information to a user information element of the call setup message.

32. A communication system according to claim 30, wherein said identification information addition means adds the identification information to a sub-address of the call setup message.

* * * * *

UNITED STATES PATENT AND TRADEMARK OFFICE
CERTIFICATE OF CORRECTION

PATENT NO.   : 6,105,054
DATED        : August 15, 2000
INVENTOR(S)  : Masanori Kawashima It is certified that error appears in the above-identified patent and that said Letters Patent is hereby corrected as shown below:

Title [54]
"THE" should read -- THEN --.

Column 1,
Line 5, "THE" should read -- THEN --.

Column 6,
Line 5, "provide" should read -- provide a --.
Line 16, "provide" should read -- provide a --.
Line 21, "provide" should read -- provide a --.
Line 56, "a conventional an example of" should read -- an example of a conventional --.
Line 62, "a conventional an example of" should read -- an example of a conventional --.

Column 9,
Line 20, "is waiting for" should be deleted.
Line 52, "indicate" should read -- indicates --.

Column 10,
Line 29, "are waiting for" should be deleted.
Line 54, "Those information are" should read -- That information is --.

Column 13,
Line 22, "connect to connect" should read -- to --.
Line 47, "participate" should read -- participate in --.
Line 50, "participate" should read -- participate in --.
Line 51, "to" should read -- in --.
Line 61, "pate" should read -- pate in --.

Column 14,
Line 22, "do not need" should read -- that do not need --.
Line 23, "do not spend" should read -- that do not spend --.
Line 66, "nest" should read -- next --.

Column 15,
Line 1, "connections" should read -- connection --.
Line 59, "prenoticed" should read -- prenotified --.
Line 61, "participate" should read -- participate in --.
Line 64, "the own" should read -- its own --.

UNITED STATES PATENT AND TRADEMARK OFFICE
CERTIFICATE OF CORRECTION

PATENT NO. : 6,105,054
DATED : August 15, 2000
INVENTOR(S) : Masanori Kawashima

Page 2 of 2

It is certified that error appears in the above-identified patent and that said Letters Patent is hereby corrected as shown below:

Column 16,
Line 8, "nections field" should read -- nection field --.
Line 48, "connections field" should read -- connection field --.

Column 17,
Line 26, "and if it is not included, the" should be deleted.
Line 27, "proceeds to S1906 (yes in S1904)," should be deleted.
Line 66, "participate" should read -- participate in --.

Column 18,
Line 7, "the" should read -- its --.
Line 26, "nections field" should read -- nection field --.
Line 64, "connections" should read -- connection --.

Column 19,
Line 44, "participate" should read -- participate in --.

Column 22,
Line 62, "instructions; and" should read -- instructions;--.
Line 67, "instructions;" should read -- instructions and --.

Column 23,
Line 3, "period; and" should read -- period, --.
Line 21, "instructions; and" should read -- instructions; --.

Signed and Sealed this

Twenty-first Day of August, 2001

Attest:

*Nicholas P. Godici*

NICHOLAS P. GODICI
*Acting Director of the United States Patent and Trademark Office*

*Attesting Officer*